US009825545B2

(12) United States Patent
Chen et al.

(10) Patent No.: US 9,825,545 B2
(45) Date of Patent: Nov. 21, 2017

(54) SWITCHED-CAPACITOR SPLIT DRIVE TRANSFORMER POWER CONVERSION CIRCUIT

(71) Applicant: Massachusetts Institute of Technology, Cambridge, MA (US)

(72) Inventors: Minjie Chen, Brighton, MA (US); David J. Perreault, Andover, MA (US); Khurram K. Afridi, Boulder, CO (US)

(73) Assignee: Massachusetts Institute of Technology, Cambridge, MA (US)

( * ) Notice: Subject to any disclaimer, the term of this patent is extended or adjusted under 35 U.S.C. 154(b) by 54 days.

(21) Appl. No.: 14/911,774

(22) PCT Filed: Oct. 29, 2014

(86) PCT No.: PCT/US2014/062859
§ 371 (c)(1),
(2) Date: Feb. 12, 2016

(87) PCT Pub. No.: WO2015/069516
PCT Pub. Date: May 14, 2015

(65) Prior Publication Data
US 2016/0190943 A1 Jun. 30, 2016

Related U.S. Application Data

(60) Provisional application No. 61/896,702, filed on Oct. 29, 2013.

(51) Int. Cl.
*G05F 1/00* (2006.01)
*H02M 3/335* (2006.01)
(Continued)

(52) U.S. Cl.
CPC ....... *H02M 3/33546* (2013.01); *H02M 3/158* (2013.01); *H02M 3/335* (2013.01);
(Continued)

(58) Field of Classification Search
CPC .... H02M 3/07; H02M 3/073; H02M 3/33546; H02M 3/158; H02M 3/33576;
(Continued)

(56) References Cited

U.S. PATENT DOCUMENTS

| 3,370,215 A | 2/1968 | Light, Jr. |
|---|---|---|
| 3,745,437 A | 7/1973 | Brown |

(Continued)

FOREIGN PATENT DOCUMENTS

| DE | 103 58 299 A1 | 7/2005 |
|---|---|---|
| EP | 0 513 920 A2 | 11/1992 |

(Continued)

OTHER PUBLICATIONS

International Preliminary Report on Patentability dated May 12, 2016 for PCT Application No. PCT/US2014/062859; 9 pages.

(Continued)

*Primary Examiner* — Alex Torres-Rivera
(74) *Attorney, Agent, or Firm* — Daly, Crowley, Mofford & Durkee, LLP

(57) ABSTRACT

A split drive transformer (SDT) and use of such a transformer in a power converter is described. The power converter includes a power and distributor circuit configured to receive one or more input signals and provides multiple signals to a first side of the SDT. The SDT receives the signals provided to the first side thereof and provides signals at a second side thereof to a power combiner and rectifier circuit which is configured to provide output signals to a load. In some embodiments, the SDT may be provided as a switched-capacitor (SC) SDT. In some embodiments, the (Continued)

power converter may optionally include a level selection circuit (LSC) on one or both of the distributor and combiner sides.

24 Claims, 27 Drawing Sheets

(51) Int. Cl.
*H02M 7/12* (2006.01)
*H02M 7/68* (2006.01)
*H02M 3/158* (2006.01)
*H02M 1/00* (2006.01)

(52) U.S. Cl.
CPC ... *H02M 3/33569* (2013.01); *H02M 3/33576* (2013.01); *H02M 7/12* (2013.01); *H02M 7/68* (2013.01); *H02M 2001/0074* (2013.01); *H02M 2001/0077* (2013.01)

(58) Field of Classification Search
CPC ............ H02M 3/33569; H02M 3/335; H02M 3/33507; H02M 7/68; H02M 7/12; H02M 2001/0077; H02M 2001/0074; H02M 2007/4815; H02M 7/064; H02M 7/10; H02M 7/19; H02M 7/25; Y02B 70/1416; Y02B 70/1433
USPC .......................................... 363/17, 59, 60, 61
See application file for complete search history.

(56) References Cited

U.S. PATENT DOCUMENTS

| | | | |
|---|---|---|---|
| 3,818,360 A | 6/1974 | Boutmy et al. | |
| 4,214,174 A | 7/1980 | Dickson | |
| 4,513,364 A | 4/1985 | Nilssen | |
| 4,812,961 A | 3/1989 | Essaff et al. | |
| 4,903,181 A | 2/1990 | Seidel | |
| 5,057,986 A | 10/1991 | Henze et al. | |
| 5,119,283 A | 6/1992 | Steigerwald et al. | |
| 5,132,606 A | 7/1992 | Herbert | |
| 5,159,539 A | 10/1992 | Koyama | |
| 5,198,970 A | 3/1993 | Kawabata et al. | |
| 5,268,832 A | 12/1993 | Kandatsu | |
| 5,301,097 A | 4/1994 | McDaniel | |
| 5,331,303 A | 7/1994 | Shiota | |
| 5,402,329 A | 3/1995 | Wittenbreder, Jr. | |
| 5,461,297 A * | 10/1995 | Crawford | H02M 3/28 320/166 |
| 5,557,193 A | 9/1996 | Kajimoto | |
| 5,561,597 A | 10/1996 | Limpaecher | |
| 5,661,348 A | 8/1997 | Brown | |
| 5,717,581 A | 2/1998 | Canclini | |
| 5,737,201 A | 4/1998 | Meynard et al. | |
| 5,744,988 A | 4/1998 | Condon et al. | |
| 5,761,058 A | 6/1998 | Kanda et al. | |
| 5,793,626 A | 8/1998 | Jiang | |
| 5,801,987 A | 9/1998 | Dinh | |
| 5,812,017 A | 9/1998 | Golla et al. | |
| 5,831,846 A | 11/1998 | Jiang | |
| 5,886,888 A * | 3/1999 | Akamatsu | H02J 3/01 363/65 |
| 5,892,395 A | 4/1999 | Stengel et al. | |
| 5,907,484 A | 5/1999 | Kowshik et al. | |
| 5,956,243 A | 9/1999 | Mao | |
| 5,959,565 A | 9/1999 | Taniuchi et al. | |
| 5,978,283 A | 11/1999 | Hsu et al. | |
| 5,982,645 A | 11/1999 | Levran et al. | |
| 6,084,789 A | 7/2000 | Van Lieshout | |
| 6,107,864 A | 8/2000 | Fukushima et al. | |
| 6,133,788 A | 10/2000 | Dent | |
| 6,140,807 A | 10/2000 | Vannatta et al. | |
| 6,154,380 A | 11/2000 | Assow et al. | |
| 6,157,253 A | 12/2000 | Sigmon et al. | |
| 6,178,102 B1 | 1/2001 | Stanley | |
| 6,198,645 B1 | 3/2001 | Kotowski et al. | |
| 6,255,906 B1 | 7/2001 | Eidson et al. | |
| 6,256,214 B1 | 7/2001 | Farrington et al. | |
| 6,275,018 B1 | 8/2001 | Telefus et al. | |
| 6,327,462 B1 | 12/2001 | Loke et al. | |
| 6,339,538 B1 | 1/2002 | Handleman | |
| 6,353,547 B1 * | 3/2002 | Jang | H02M 7/487 363/132 |
| 6,377,117 B2 | 4/2002 | Oskowsky et al. | |
| 6,396,341 B1 | 5/2002 | Pehlke | |
| 6,476,666 B1 | 11/2002 | Palusa et al. | |
| 6,486,728 B2 | 11/2002 | Kleveland | |
| 6,501,325 B1 | 12/2002 | Meng | |
| 6,504,422 B1 | 1/2003 | Rader et al. | |
| 6,507,503 B2 | 1/2003 | Norrga | |
| 6,515,612 B1 | 2/2003 | Abel | |
| 6,563,235 B1 | 5/2003 | McIntyre et al. | |
| 6,573,760 B1 | 6/2003 | Gabara | |
| 6,597,593 B1 | 7/2003 | Cruz et al. | |
| 6,650,552 B2 * | 11/2003 | Takagi | H02M 3/33592 323/266 |
| 6,700,803 B2 | 3/2004 | Krein | |
| 6,738,277 B2 | 5/2004 | Odell | |
| 6,738,432 B2 | 5/2004 | Pehlke et al. | |
| 6,759,766 B2 | 7/2004 | Hiratsuka et al. | |
| 6,927,441 B2 | 8/2005 | Pappalardo et al. | |
| 6,934,167 B2 | 8/2005 | Jang et al. | |
| 6,980,181 B2 | 12/2005 | Sudo | |
| 7,042,742 B2 | 5/2006 | Lin | |
| 7,072,195 B2 | 7/2006 | Xu | |
| 7,091,778 B2 | 8/2006 | Gan et al. | |
| 7,103,114 B1 | 9/2006 | Lapierre | |
| 7,135,847 B2 | 11/2006 | Taurand | |
| 7,145,382 B2 | 12/2006 | Ker et al. | |
| 7,157,956 B2 | 1/2007 | Wei | |
| 7,161,816 B2 | 1/2007 | Shteynberg et al. | |
| 7,190,210 B2 | 5/2007 | Azrai et al. | |
| 7,224,062 B2 | 5/2007 | Hsu | |
| 7,236,542 B2 | 6/2007 | Matero | |
| 7,239,194 B2 | 7/2007 | Azrai et al. | |
| 7,250,810 B1 | 7/2007 | Tsen et al. | |
| 7,269,036 B2 | 9/2007 | Deng et al. | |
| 7,330,070 B2 | 2/2008 | Vaisanen | |
| 7,362,251 B2 | 4/2008 | Jensen et al. | |
| 7,375,992 B2 | 5/2008 | Mok et al. | |
| 7,382,113 B2 | 6/2008 | Wai et al. | |
| 7,382,634 B2 | 6/2008 | Buchmann | |
| 7,408,330 B2 | 8/2008 | Zhao | |
| 7,443,705 B2 | 10/2008 | Ito | |
| 7,511,978 B2 | 3/2009 | Chen et al. | |
| 7,521,914 B2 | 4/2009 | Dickerson et al. | |
| 7,535,133 B2 | 5/2009 | Perreault et al. | |
| 7,589,605 B2 | 9/2009 | Perreault et al. | |
| 7,595,682 B2 | 9/2009 | Lin et al. | |
| 7,596,002 B2 * | 9/2009 | Teichmann | H02M 3/33523 363/18 |
| 7,616,467 B2 | 11/2009 | Mallwitz | |
| 7,622,984 B2 | 11/2009 | Lesso et al. | |
| 7,633,778 B2 | 12/2009 | Mok et al. | |
| 7,696,735 B2 | 4/2010 | Oraw et al. | |
| 7,705,681 B2 | 4/2010 | Ilkov | |
| 7,724,551 B2 | 5/2010 | Yanagida et al. | |
| 7,768,800 B2 | 8/2010 | Mazumduer et al. | |
| 7,777,459 B2 | 8/2010 | Williams | |
| 7,782,027 B2 | 8/2010 | Williams | |
| 7,786,712 B2 | 8/2010 | Williams | |
| 7,807,499 B2 | 10/2010 | Nishizawa | |
| 7,812,579 B2 | 10/2010 | Williams | |
| 7,889,519 B2 | 2/2011 | Perreault et al. | |
| 7,907,429 B2 | 3/2011 | Ramadass et al. | |
| 7,907,430 B2 | 3/2011 | Kularatna et al. | |
| 7,928,705 B2 | 4/2011 | Hooijschuur et al. | |
| 7,940,038 B2 | 5/2011 | Da Silva et al. | |
| 7,948,221 B2 | 5/2011 | Watanabe et al. | |
| 7,956,572 B2 | 6/2011 | Zane et al. | |
| 7,977,921 B2 | 7/2011 | Bahai et al. | |
| 7,990,742 B2 | 8/2011 | Lesso | |
| 7,999,601 B2 | 8/2011 | Schlueter et al. | |

(56) References Cited

U.S. PATENT DOCUMENTS

| | | |
|---|---|---|
| 8,000,117 B2 | 8/2011 | Petricek |
| 8,018,216 B2 | 9/2011 | Kakehi |
| 8,026,763 B2 | 9/2011 | Dawson et al. |
| 8,040,174 B2 | 10/2011 | Likhterov |
| 8,048,766 B2 | 11/2011 | Joly et al. |
| 8,085,524 B2 | 12/2011 | Roozeboom et al. |
| 8,111,054 B2 | 2/2012 | Yen et al. |
| 8,130,518 B2 | 3/2012 | Fishman |
| 8,159,091 B2 | 4/2012 | Yeates |
| 8,164,384 B2 | 4/2012 | Dawson et al. |
| 8,169,797 B2 | 5/2012 | Coccia et al. |
| 8,193,604 B2 | 6/2012 | Lin et al. |
| 8,212,541 B2 | 7/2012 | Perreault |
| 8,276,002 B2 | 9/2012 | Dennard et al. |
| 8,339,184 B2 | 12/2012 | Kok et al. |
| 8,350,549 B2 | 1/2013 | Kitabatake |
| 8,384,467 B1 | 2/2013 | O'Keeffe et al. |
| 8,395,914 B2 | 3/2013 | Klootwijk et al. |
| 8,427,851 B2 | 4/2013 | Lesso |
| 8,451,053 B2 | 5/2013 | Perreault et al. |
| 8,456,874 B2 | 6/2013 | Singer et al. |
| 8,503,203 B1 | 8/2013 | Szczeszynski et al. |
| 8,643,347 B2 | 2/2014 | Perreault et al. |
| 8,659,353 B2 | 2/2014 | Dawson et al. |
| 8,699,248 B2 | 4/2014 | Perreault et al. |
| 8,718,188 B2 | 5/2014 | Balteanu et al. |
| 8,729,819 B2 | 5/2014 | Zhao et al. |
| 8,824,978 B2 | 9/2014 | Briffa et al. |
| 8,829,993 B2 | 9/2014 | Briffa et al. |
| 8,830,709 B2 | 9/2014 | Perreault et al. |
| 8,830,710 B2 | 9/2014 | Perreault et al. |
| 8,860,396 B2 | 10/2014 | Giuliano |
| 8,957,727 B2 | 2/2015 | Dawson et al. |
| 9,020,453 B2 | 4/2015 | Briffa et al. |
| 9,048,727 B2 | 6/2015 | Giuliano et al. |
| 9,054,576 B2 | 6/2015 | Kang et al. |
| 9,141,832 B2 | 9/2015 | Perreault et al. |
| 9,160,287 B2 | 10/2015 | Briffa et al. |
| 9,166,536 B2 | 10/2015 | Briffa et al. |
| 9,172,336 B2 | 10/2015 | Briffa et al. |
| 9,236,794 B2 | 1/2016 | Lesso |
| 9,490,752 B2 | 11/2016 | Briffa et al. |
| 9,531,291 B2 | 12/2016 | Perreault |
| 2003/0086282 A1* | 5/2003 | Zeng ............... H02M 3/33592 363/95 |
| 2003/0169096 A1 | 9/2003 | Hsu et al. |
| 2003/0227280 A1 | 12/2003 | Vinciarelli |
| 2004/0041620 A1 | 3/2004 | D'Angelo et al. |
| 2004/0125618 A1 | 7/2004 | DeRooij et al. |
| 2004/0170030 A1 | 9/2004 | Duerbaum et al. |
| 2004/0222775 A1 | 11/2004 | Muramatsu et al. |
| 2004/0264215 A1* | 12/2004 | Ambo ..................... H02M 1/36 363/17 |
| 2005/0007184 A1 | 1/2005 | Kamijo |
| 2005/0088865 A1 | 4/2005 | Lopez et al. |
| 2005/0162144 A1 | 7/2005 | Kernahan |
| 2005/0207133 A1 | 9/2005 | Pavier et al. |
| 2005/0213267 A1 | 9/2005 | Azrai et al. |
| 2005/0286278 A1 | 12/2005 | Perreault et al. |
| 2006/0022660 A1 | 2/2006 | Itoh |
| 2006/0152947 A1* | 7/2006 | Baker ................. H02M 1/4241 363/16 |
| 2007/0035977 A1 | 2/2007 | Odell |
| 2007/0066224 A1 | 3/2007 | d'Hont et al. |
| 2007/0066250 A1 | 3/2007 | Takahashi et al. |
| 2007/0069818 A1 | 3/2007 | Bhatti et al. |
| 2007/0091655 A1 | 4/2007 | Oyama et al. |
| 2007/0123184 A1 | 5/2007 | Nesimoglu et al. |
| 2007/0146020 A1 | 6/2007 | Williams |
| 2007/0146090 A1 | 6/2007 | Carey et al. |
| 2007/0159257 A1 | 7/2007 | Lee et al. |
| 2007/0210774 A1 | 9/2007 | Kimura et al. |
| 2007/0230221 A1 | 10/2007 | Lim et al. |
| 2007/0247222 A1 | 10/2007 | Sorrells et al. |
| 2007/0247253 A1 | 10/2007 | Carey et al. |
| 2007/0281635 A1 | 12/2007 | McCallister et al. |
| 2007/0290747 A1 | 12/2007 | Traylor et al. |
| 2007/0291718 A1 | 12/2007 | Chan et al. |
| 2007/0296383 A1 | 12/2007 | Xu et al. |
| 2008/0001660 A1 | 1/2008 | Rasmussen |
| 2008/0003960 A1 | 1/2008 | Zolfaghari |
| 2008/0003962 A1 | 1/2008 | Ngai |
| 2008/0007333 A1 | 1/2008 | Lee et al. |
| 2008/0012637 A1 | 1/2008 | Aridas et al. |
| 2008/0013236 A1 | 1/2008 | Weng |
| 2008/0019459 A1 | 1/2008 | Chen et al. |
| 2008/0031023 A1 | 2/2008 | Kitagawa et al. |
| 2008/0032473 A1 | 2/2008 | Bocek et al. |
| 2008/0062724 A1 | 3/2008 | Feng et al. |
| 2008/0150621 A1 | 6/2008 | Lesso et al. |
| 2008/0157732 A1 | 7/2008 | Williams |
| 2008/0157733 A1 | 7/2008 | Williams |
| 2008/0158915 A1 | 7/2008 | Williams |
| 2008/0239772 A1 | 10/2008 | Oraw et al. |
| 2008/0265586 A1 | 10/2008 | Like et al. |
| 2009/0002066 A1 | 1/2009 | Lee et al. |
| 2009/0059630 A1 | 3/2009 | Williams |
| 2009/0072800 A1 | 3/2009 | Ramadass et al. |
| 2009/0102439 A1 | 4/2009 | Williams |
| 2009/0147554 A1 | 6/2009 | Adest et al. |
| 2009/0196082 A1 | 8/2009 | Mazumder et al. |
| 2009/0257211 A1 | 10/2009 | Kontani et al. |
| 2009/0273955 A1 | 11/2009 | Tseng et al. |
| 2009/0278520 A1 | 11/2009 | Perreault et al. |
| 2009/0302686 A1 | 12/2009 | Fishman |
| 2009/0303753 A1 | 12/2009 | Fu et al. |
| 2009/0323380 A1 | 12/2009 | Harrison |
| 2010/0073084 A1 | 3/2010 | Hur et al. |
| 2010/0085786 A1 | 4/2010 | Chiu et al. |
| 2010/0110741 A1 | 5/2010 | Lin et al. |
| 2010/0117612 A1 | 5/2010 | Klootwijk et al. |
| 2010/0120384 A1 | 5/2010 | Pennec |
| 2010/0126550 A1 | 5/2010 | Foss |
| 2010/0140736 A1 | 6/2010 | Lin et al. |
| 2010/0142239 A1 | 6/2010 | Hopper |
| 2010/0201441 A1 | 8/2010 | Gustavsson |
| 2010/0202161 A1 | 8/2010 | Sims et al. |
| 2010/0214746 A1 | 8/2010 | Lotfi et al. |
| 2010/0244189 A1 | 9/2010 | Klootwijk et al. |
| 2010/0244585 A1 | 9/2010 | Tan et al. |
| 2010/0308751 A1 | 12/2010 | Nerone |
| 2011/0001542 A1 | 1/2011 | Ranta et al. |
| 2011/0026281 A1 | 2/2011 | Chapman et al. |
| 2011/0090038 A1 | 4/2011 | Perchlik |
| 2011/0101938 A1 | 5/2011 | Ma et al. |
| 2011/0148518 A1 | 6/2011 | Lejon et al. |
| 2011/0163414 A1 | 7/2011 | Lin et al. |
| 2011/0193515 A1 | 8/2011 | Wu et al. |
| 2011/0221346 A1 | 9/2011 | Lee et al. |
| 2011/0221398 A1 | 9/2011 | Ferber, Jr. |
| 2011/0273020 A1 | 11/2011 | Balachandreswaran et al. |
| 2012/0043818 A1 | 2/2012 | Stratakos et al. |
| 2012/0119676 A1 | 5/2012 | Yao |
| 2012/0146177 A1 | 6/2012 | Choi et al. |
| 2012/0153907 A1 | 6/2012 | Carobolante et al. |
| 2012/0218797 A1 | 8/2012 | Li et al. |
| 2013/0049714 A1 | 2/2013 | Chiu |
| 2013/0094157 A1 | 4/2013 | Giuliano |
| 2013/0154600 A1 | 6/2013 | Giuliano |
| 2014/0112026 A1* | 4/2014 | Pan ..................... H02M 3/07 363/21.02 |
| 2014/0153303 A1* | 6/2014 | Potharaju ............ H02M 7/06 363/126 |
| 2014/0167513 A1 | 6/2014 | Chang et al. |
| 2014/0226377 A1 | 8/2014 | Goetz et al. |
| 2014/0306648 A1 | 10/2014 | Le et al. |
| 2014/0306673 A1 | 10/2014 | Le et al. |
| 2014/0313781 A1 | 10/2014 | Perreault et al. |
| 2014/0339918 A1 | 11/2014 | Perreault et al. |
| 2014/0346962 A1 | 11/2014 | Sanders et al. |
| 2014/0355322 A1 | 12/2014 | Perreault et al. |
| 2015/0022173 A1 | 1/2015 | Le et al. |
| 2015/0023063 A1 | 1/2015 | Perreault et al. |

(56) References Cited

U.S. PATENT DOCUMENTS

| | | | |
|---|---|---|---|
| 2015/0029761 A1* | 1/2015 | Trinh | H02M 1/36 363/17 |
| 2015/0035453 A1* | 2/2015 | Seki | H05B 33/08 315/294 |
| 2015/0084701 A1 | 3/2015 | Perreault | |
| 2015/0097538 A1 | 4/2015 | Le et al. | |
| 2015/0155895 A1 | 6/2015 | Perreault et al. | |
| 2015/0171768 A1 | 6/2015 | Perreault | |
| 2015/0188448 A1 | 7/2015 | Perreault et al. | |
| 2015/0194940 A1 | 7/2015 | Briffa et al. | |
| 2015/0280553 A1 | 10/2015 | Giuliano et al. | |
| 2015/0295497 A1 | 10/2015 | Perreault et al. | |
| 2015/0357912 A1 | 12/2015 | Perreault et al. | |
| 2015/0365052 A1 | 12/2015 | Barton et al. | |
| 2015/0372646 A1 | 12/2015 | Briffa et al. | |
| 2016/0006365 A1 | 1/2016 | Perreault et al. | |

FOREIGN PATENT DOCUMENTS

| | | |
|---|---|---|
| EP | 1 750 366 A2 | 2/2007 |
| EP | 1 750 366 A3 | 2/2007 |
| JP | H10327573 A | 12/1998 |
| JP | H11235053 A | 8/1999 |
| JP | 2002-62858 | 2/2002 |
| JP | 2010/045943 A | 2/2010 |
| JP | 2010-74930 A | 4/2010 |
| JP | 2012-65434 A | 3/2012 |
| WO | WO 2006/093600 A2 | 9/2006 |
| WO | WO 2007/136919 A2 | 11/2007 |
| WO | WO 2007/136919 A3 | 11/2007 |
| WO | WO 2009/112900 A1 | 9/2009 |
| WO | WO 2012151466 A2 | 11/2012 |
| WO | WO 2013/059446 A1 | 4/2013 |
| WO | WO 2013/096416 A1 | 6/2013 |
| WO | WO2013086445 A1 | 6/2013 |
| WO | WO 2013/134573 A1 | 9/2013 |
| WO | WO 2014/070998 A1 | 5/2014 |

OTHER PUBLICATIONS

U.S. Appl. No. 15/149,491, filed May 9, 2016, Perreault, et al.
Non-Final Office Action dated Oct. 3. 2016; for U.S. Appl. No. 14/758,033; 28 pages.
U.S. Appl. No. 15/290,402, filed Oct. 11, 2016, Perreault, et al.
U.S. Appl. No. 15/287,068, filed Oct. 6, 2016, Briffa, et al.
U.S. Appl. No. 15/354,170, filed Nov. 17, 2016, Briffa, et al.
U.S. Appl. No. 15/398,172, filed Jan. 4, 2017, Inam, et al.
Han, et al.; "A New Approach to Reducing Output Ripple in Switched-Capacitor-Based Step-Down DC-DC Converters:" IEEE Transactions on Power Electronics; vol. 21; No. 6; Nov. 2006; 8 pages.
Lei, et al.; "Analysis of Switched-Capacitor DC-DC Converters in Soft-Charging Operation;" 14$^{th}$ IEEE Workshop on Control and Modelling for Power Electronics; Jun. 23, 2013; 7 pages.
Linear Technology Data Sheet for Part LTC3402; "2A, 3MHz Micropower Synchronous Boost Converter;" 2000; 16 pages.
Makowski, et al; "Performance Limits of Switched-Capacitor DC-DC Converters;" IEEE PESC'95; 26$^{th}$ Annual Power Electronics Specialists Conference; vol. 2; Jul. 1995; 7 pages.
Meynard, et al.; "Multi-Level Conversion: High Voltage Choppers and Voltage-Source Inverters;" 23$^{rd}$ Annual IEEE Power Electronics Specialists Conference; Jan. 1992; 7 pages.
Middlebrook; "Trannsformerless DC-to-DC Converters with Large Conversion Ratios;" IEEE Transactions on Power Electronics: vol. 3; No. 4: Oct. 1988; 5 pages.
Ng; "Switched Capacitor DC-DC Converter: Superior Where the Buck Converter Has Dominated;" PhD Thesis, UC Berkeley; Aug. 17, 2011; 138 pages.
Pilawa-Podgurski, et al.; "Merged Two-Stage Power Converter Architecture with Soft Charging Switched-Capacitor Energy Transfer;" 2008 IEEE Power Electronics Specialists Conference; Jun. 15-19, 2008; 8 pages.

Texas Instruments Data Sheet for Part TPS54310; "3-V to 6-V Input, 3-A Output Synchronous-Buck PWM Switcher with Integrated FETs (SWIFT);" dated Jan. 2005; 19 pages.
Umeno, et al.; "A New Approach to Low Ripple-Noise Switching Converters on the Basis of Switched-Capacitor Converters;" IEEE International Symposium on Circuits and Systems; Jun. 11-14, 1991; 4 pages.
U.S. Appl. No. 14/974,563, filed Dec. 18, 2015, Perreault, et al.
U.S. Appl. No. 14/975,472, filed Dec. 19, 2015, Perreault, et al.
Casey, et al.; "Issues Regarding the Capacitance of 1-10 MHz Transformers;" Applied Power Electronics Conference and Exposition; APEC 88; Third Annual IEEE; Feb. 1-5, 1988; pp. 352-359; 8 pages.
Costinett, et al.; "Design and Control for High Efficiency in High Step-Down Dual Active Bridge Converters Operating at High Switching Frequency;" IEEE Transactions on Power Electronics; vol. 28; No. 8; Aug. 2013; pp. 3931-3940; 10 pages.
Goldberg, et al.; "Issues Related to 1-10-MHz Transformer Design;" IEEE Transactions on Power Electronics; vol. 4; No. 1; Jan. 1989; pp. 113-123; 11 pages.
Goldberg; "The Relationship Between Size and Power Dissipation in a 1-10 MHz Transformer;" Power Electronics Specialists Conference, 89; 20$^{th}$ Annual IEEE; Jun. 26-29, 1989; pp. 625-634; 10 pages.
Gu, et al.; "A Study of Volume and Weight vs. Frequency for High-Frequency Transformers;" Power Electronics Specialists Conference 1993; PESC 93; 24$^{th}$ Annual IEEE; Jun. 20-24, 1993; pp. 1123-1129; 7 pages.
Gu, et al.; "Hybrid Transformer ZVS/ZCS DC-DC Converter for Photovoltaic Microinverters;" Applied Power Electronics Conference and Exposition; APEC, 2013 Twenty-Eighth Annual IEEE; Mar. 17-21, 2013; pp. 16-22; 7 pages.
Han, et al.; "Evaluation of Magnetic Materials for Very High Frequency Power Applications;" IEEE Power Electronics Specialists Conference; Jun. 2008; pp. 4270-4276; 8 pages.
Kheraluwala, et al.; "Performance Characterization of a High-Power Dual Active Bridge dc-to-dc Converter;" IEEE Transactions on Industry Applications; vol. 28, No. 6; Nov./Dec. 1992; pp. 1294-1301; 8 pages.
Pascual, et al.; "Switched Capacitor System for Automatic Series Battery Equalization;" Applied Power Electronics Conference and Exposition, 1997; APEC 97; Conference Proceedings; Twelfth Annual; Feb. 23-27, 1997; vol. 2; pp. 848-854; 7 pages.
Schlecht, et al.; "Active Power Factor Correction for Switching Power Supplies;" IEEE Transactions on Power Electronics; vol. PE-2; No. 4; Oct. 1987; pp. 273-281; 9 pages.
Severns, et al.; "Modern DC-to-DC Switchmode Power Converter Circuits;" Bloom Associates, Inc.; Chapter 9; pp. 199-211; 14 pages.
Trubitsyn, et al.; "High-Efficiency Inverter for Photovoltaic Applications" 2010 IEEE Energy Conversion Congress and Exposition; Sep. 2010; pp. 2203-2010; 8 pages.
Vorpérian; Synthesis of Medium Voltage dc-to-dc Converters from Low-Voltage, High-Frequency PWM Switching Converters; IEEE Transactions on Power Electronics; vol. 22; No. 5; Sep. 5, 2007; pp. 1619-1635; 17 pages.
Wei, et al.; "Comparison of Three Topology Candidates for 12V VRM;" Applied Power Electronics Conference and Exposition, 2001; APEC 2001; Sixteen Annual IEEE; vol. 1; Mar. 2001; pp. 245-251; 7 pages.
PCT Search Report & Written Opinion of the ISA for Appl. No. PCT/US14/62859 dated Jan. 22, 2015; 12 pages.
U.S. Appl. No. 14/920,031, filed Oct. 22, 2015, Briffa, et al.
U.S. Appl. No. 14/968,045, filed Dec. 14, 2015, Perreault, et al.
Han, et al.; Analysis and Design of High Efficiency Matching Networks; IEEE Transactions on Power Electronics; vol. 21; No. 5, Sep. 2006; pp. 1484-1491.
Li, et al.; "Switched-Capacitor Step-Down Rectifier for Low-Voltage Power Conversion;" IEEE Applied Power Electronics Conference and Exposition (APEC); Mar. 17-21, 2013; pp. 1884-1891.
Perreault, et al.; "Power Delivery and Conversion for Microprocessors;" Semiconductor Research Corporation; FCRP; e-workshop; Jul. 19, 2012; 45 pages.
Perreault, et al.; IFC Biannual Review; Aug. 18, 2011; 19 pages.

(56) References Cited

OTHER PUBLICATIONS

Rodriguez, et al.; "A Multilevel Inverter Topology for Inductively-Coupled Power Transfer;" IEEE, Applied Power Electronics Conference and Exposition, 2003 (APEC); vol. 2; Feb. 9-13, 2003; pp. 118-1126.
Yao, et al.; "Microfabricated V-Groove Power Inductors Using Multilayer Co—Zr—O Thin Films for Very-High-Frequency DC-DC Converters;" Energy Conversion Congress and Exposition (ECCE); Sep. 17-22, 2011; pp. 1845-1852.
Chang et al.; "A Systems Approach to Photovoltaic Energy Extraction;" 27th Annual IEEE Applied Power Electronics Conference and Exposition; Feb. 5-9, 2012; 18 pages.
Pease; "What's All This Common-Centroid Stuff, Anyhow?;" Electronic Design; Oct. 1, 1996; 4 pages.
Alspach; "Solar Power Inverter Manufacturers Get Day in Sun;" Boston Business Journal; Oct. 29, 2010; 1 page.
Denning; "Solar Market Is Risking Sunstroke;" Wall Street Journal; Dec. 11-12, 2010, 1 page.
Pierquet, et al.; "A Single-Phase Photovoltaic Inverter Topology with a Series-Connected Power Buffer;" (ECCE), IEEE, Sep. 2010, pp. 1-9.
Trubitsyn, et al.; High-Efficiency Inverter for Photovoltaic Applications; (ECCE), IEEE, Sep. 2010, pp. 1-9.
Bush, et al.; "A Single-Phase Current Source Solar Inverter with Reduced-Size DC Link;" Energy Conversion Congress and Exposition; IEEE; Sep. 20, 2009; 6 Pages.
Krein, et al.; "Cost-Effective Hundred-Year Life for Single-Phase Inverters and Rectifiers in Solar and LED Lighting Applications Based on Minimum Capacitance Requirements and a Ripple Power Port;" Applied Power Electronics Conference and Exposition; IEEE; Feb. 15, 2009; 6 Pages.
Li; "A Review of the Single Phase Photovoltaic Module Integrated Converter Topologies With Three Different DC Link Configurations;" IEEE Transactions on Power Electronics; vol. 23; No. 3; May 2008; 14 Pages.
Ozpineci, et al.; "Cycloconverters;" An on-line tutorial for the IEEE Power Electronics Society; http://pels.org/Comm/Education/Tutorials/tutorials.htm; 2001; 17 Pages.
Xuejun Zhang, et al., "Analysis of Power Recycling Techniques for RF and Microwave Outphasing Power Amplifiers", IEEE Transactions on Circuits and Systems—II: Analog and Digital Signal Porcessing, vol. 49, No. 5, May 2002, 9 Pages.
Sungwon Chung, et al., "Asymmetric Multilevel Outphasing Architecture for Multi-Standard Transmitters", 2009 IEEE Radio Frequency Integrated Circuits Symposium, 4 Pages.
D. Diaz, et al., "Comparison of Two Different Cell Topologies for a Multilevel Power Supply to Achieve High Efficiency Envelope Amplifier", IEEE , 2009, 6 Pages.
M. Rodriguez, et al., "Multilevel Converter for Envelope Tracking in RF Power Amplifiers", IEEE, 2009, 8 Pages.
Yuan-Jyue Chen, et al., "Multilevel LINC System Design for Wireless Transmitters", IEEE, 2007, 4 Pages.
Jinsung Choi, et al., "A ΔΣ-Digitized Polar RF Transmitter", IEEE Transactions on Microwave Theory and Techniques, vol. 55, No. 12, Dec. 2007, 12 Pages.
Kai-Yuan Jheng, et. al., "Multilevel LINC System Design for Power Efficiency Enhancement", IEEE, 2007, 4 Pages.
Kevin Tom, et al., "Load-Pull Analysis of Outphasing Class-E Power Amplifier", The 2nd International Conference on Wireless Broadband and Ultra Wideband Communications (AusWireless 2007), IEEE, 2007, 4 Pages.
Yehui Han, et al., "Resistance Compression Networks for Radio-Frequency Power Conversion", IEEE Transactions on Power Electronics, vol. 22, No. 1, Jan. 2007, 13 Pages.
Surya Musunuri, et al., "Improvement of Light-Load Efficiency Using Width-Switching Scheme for CMOS Transistors", IEEE Power Electronics Letters, vol. 3, No. 3, Sep. 2005, 6 Pages.
Frederick H. Raab, et al., "RF and Microwave Power Amplifier and Transmitter Technologies—Part 3", Sep. 2003, High Frequency Electronics, Summit Technical Media, LLC., 9 Pages.

Petri Eloranta, et al., "A Multimode Transmitter in 0.13 μm CMOS Using Direct-Digital RF Modulator", IEEE Journal of Solid-State Circuits, vol. 42, No. 12, Dec. 2007, 11 Pages.
Hur, et al., "Highly Efficient and Linear Level Shifting Digital LINC Transmitter with a Phase Offset Cancellation;" IEEE; Jul. 2009; 4 Pages.
Hur, et al., "A Multi-Level and Multi-Band Class-D CMOS Power Amplifier for the LINC System in the Cognitive Radio Application;" IEEE; Feb. 2010, 3 Pages.
Hur, et al., "Highly Efficient Uneven Multi-Level Linc Transmitter;" Electronics Letter; vol. 45; No. 16; Jul. 30, 2009; 2 Pages.
Araghchini, et al.; "A Technology Overview of the PowerChip Development Program;" IEEE Transactions on Power Electronics; vol. 28; No. 9; Sep. 2013; 20 Pages.
Chen, et al.; "Stacked Switched Capacitor Energy Buffer Architecture;" IEEE Transactions on Power Electronics; Vo. 28; No. 11; Nov. 2013; 13 Pages.
Huber, et al.; "Design-Oriented Analysis and Performance Evaluation of Buck PFC Front End;" IEEE Transactions on Power Electronics; vol. 25; No. 1; Jan. 2010; 10 Pages.
Kjaer, et al.; "Design Optimization of a Single Phase Inverter for Photovoltaic Applications;" Power Electronics Specialist Conference; 2003; PESC 03; IEEE 34th Annual; vol. 3; Jun. 15-19, 2003; 8 Pages.
Krein, et al.; "Cost-Effective Hundred-Year Life for Single Phase Inverters and Rectifiers in Solar and LED Lighting Applications Based on Minimum Capacitance Requirements and a Ripple Power Port;" Applied Power Electronics Conference and Exposition; APEC 2009; Twenty-Fourth Annual IEEE; Feb. 15-19, 2009; 6 Pages.
Kyritsis, et al.; "A Novel Parallel Active Filter for Current Pulsation Smoothing on Single Stage Grid-Connected AC-PV Modules;" Power Electronics and Applications; 2007 European Conference on; Sep. 2-5, 2007; 10 Pages.
Kyritsis, et al.; "Enhanced Current Pulsation Smoothing Parallel Active Filter for Single Stage Grid-Connected AC-PV Modules;" International Power Electronics and Motion Control Conference 2008; EPE-PEMC; 2008; 13th; 6 Pages.
Garcia, et al.; "Single Phase Power Factor Correction: A Survey;" IEEE Transactions on Power Electronics; vol. 18; No. 3; May 2003; 7 Pages.
Lam, et al.; "A Novel High-Power-Factor Single-Switch Electronic Ballast;" IEEE Transactions on Industry Applications; vol. 46; No. 6; Nov./Dec. 2010; 10 Pages.
Lim, et al.; "Power Conversion Architecture for Grid Interface at High Switching Frequency;" Applied Power Electronics Conference and Exposition (APEC); 2014 Twenty-Ninth Annual IEEE: 2014; 8 Pages.
Lim, et al.; "Two-Stage Power Conversion Architecture for an LED Driver Circuit;" Applied Power Electronics Conference and Exposition (APEC); 2013; Twenty-Eighth Annual IEEE; Mar. 17-21, 2013; 8 Pages.
Perreault, et al.; "Opportunities and Challenges in Very High Frequency Power Conversion;" Applied Power Electronics Conference and Exposition; 2009; APEC 2009; Twenty-Fourth Annual IEEE: Feb. 15-19, 2009; 14 Pages.
Pierquet, et al.; "A Single-Phase Photovoltaic Inverter Topology With a Series-Connected Energy Buffer;" IEEE Transactions on Power Electronics; vol. 28; No. 10; Oct. 2013; 9 Pages.
Pilawa-Podgurski, et al.; "Merged Two-Stage Power Converter With Soft Charging Switched-Capacitor Stage in 180 nm CMOS;" IEEE Journal of Solid-State Circuits; vol. 47; No. 7; Jul. 2012; 11 Pages.
Schlecht, et al.; "Active Power Factor Correction for Switching Power Supplies;" IEEE Transactions on Power Electronics; vol. PE-2; No. 4; Oct. 1987; 9 Pages.
Seeman, et al.; "Analysis and Optimization of Switched-Capacitor DC-DC Converters;" IEEE Transactions on Power Electronics; vol. 23; No. 2; Mar. 2008; 11 Pages.
Shimizu, et al.; "Flyback-Type Single-Phase Utility Interactive Inverter With Power Pulsation Decoupling on the DC Input for an AC Photovoltaic Module System;" IEEE Transactions on Power Electronics; vol. 21; No. 5; Sep. 2006; 9 Pages.

(56) References Cited

OTHER PUBLICATIONS

Singh, et al,; "A Review of Single-Phase Improved Power Quality AX-DC Converters;" IEEE Transactions on Industrial Electronics; vol. 50; No. 5; Oct. 2003; 20 Pages.

Keogh; Power Factor Correction Using the Buck Topology—Efficient Benefits and Practical Design Considerations; Texas Instruments; Reproduced from Texas Instruments Power Supply Design Seminar; SEM1900; Topic 4; TI Literature No. SLUP264; 2010; 36 Pages.

Tse, et al.; "A Family of PFC Voltage Regulator Configurations with Reduced Redundant Power Processing;" IEEE Transactions on Power Electronics; vol. 16; No. 6; Nov. 2001; 9 Pages.

Vorperian; "Quasi-Square-Wave Converters: Topologies and Analysis;" IEEE Transactions on Power Electronics; vol. 3; No. 2; Apr. 11988; 9 Pages.

Wu, et al.; Design Considerations of Soft-Switched Buck PFC Converter with Constant On-Time (COT) Control; IEEE Transactions on Power Electronics; vol. 26; No. 11; Nov. 2011; 9 Pages.

Zhang et al., "Single-Stage Input-Current-Shaping Technique with Voltage-Doubler-Rectifier Front End;" Proceedings of the IEEE Transactions on Power Electronics, vol. 16, No. 1; Jan. 2001; 9 Pages.

Abutbul, et al.; "Step-Up Switching-Mode Converter with High Voltage Gain Using a Switched-Capacitor Circuit;" IEEE Transactions on Circuits and Systems—1: Fundamental Theory and Applications; vol. 50, No. 8; Aug. 2003; pp. 1098-1102.

Axelrod, et al.; "Single-Switch Single-Stage Switched-Capacitor Buck Converter;" $4^{th}$ Nordic Workshop on Power and Industrial Electronics; Jun. 2004; 5 pages.

Giuliano, et al.; "Architectures and Topologies for Power Delivery;" Biannual Review of MIT Center for Integrated Circuits; Power Point Presentation; May 9, 2007; 17 slides.

Ma, et al.; "Design and Optimization on Dynamic Power Systems for Self-Powered Integrated Wireless Sensing Nodes;" Low Power Electronics and Design, 2005; ISLPED 05; Proceedings of the 2005 International Symposium; Aug. 8-10, 2005; pp. 303-306.

Maxim; Triple-Output TFT-LCD DC-DC Converters; MAX1748/ MAX8726; 19-3430; Rev 0; Oct. 2004; pp. 1-16.

Ottman, et al.; "Optimized Piezoelectric Energy Harvesting Circuit Using Step-Down Converter in Discontinuous Conduction Mode;" Power Electronics Specialists Conference, 2002; pesc 02. 2002; IEEE $33^{rd}$ Annual; vol. 4; Jun. 23-27, 2002; pp. 1988-1994.

Sun, et al.; "High Power Density, High Efficiency System Two-Stage Power Architecture for Laptop Computers;" $37^{th}$ IEEE Power Electronics Specialists Conference apros; 06; Jun. 18, 2006; 7 pages.

Wood, et al.; "Design, Fabrication and Initial Results of a 2g Autonomous Glider;" Industrial Electronics Society, IECON 2005; $31^{st}$ Annual Conference of IEEE: Nov. 6-10, 2005; pp. 1870-1877.

Xu, et al.; Voltage Divider and its Application in the Two-stage Power Architecture; Applied Power Electronics Conference and Exposition 2006; APEC 06; Twenty-First Annual IEEE: Mar. 19-23, 2006; pp. 499-505.

* cited by examiner (a)

(b)

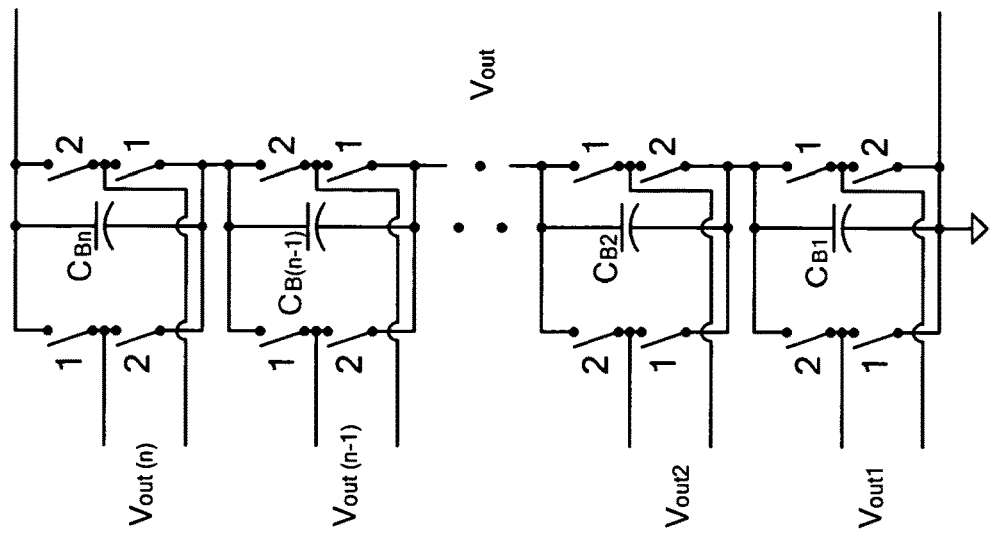
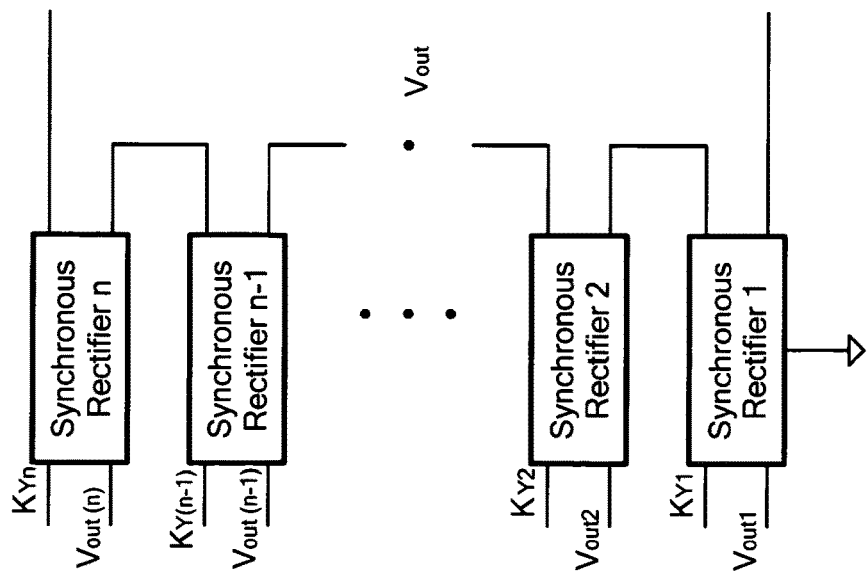
FIG. 6B
FIG. 6A

SWITCHED-CAPACITOR SPLIT DRIVE TRANSFORMER POWER CONVERSION CIRCUIT

RELATED APPLICATIONS

This application is a U.S. National Stage of PCT application PCT/US2014/062859 filed in the English language on Oct. 29, 2014, and entitled "SWITCHED-CAPACITOR SPLIT DRIVE TRANSFORMER POWER CONVERSION CIRCUIT," which claims the benefit under 35 U.S.C. §119 of provisional application No. 61/896,702 filed Oct. 29, 2013, which application is hereby incorporated herein by reference in its entirety.

FIELD

This disclosure relates generally to power converter circuits and more particularly, to the use of a transformer, inverter and rectifier structures and controls for use in power converter circuits.

BACKGROUND

As is known in the art, power supplies for dc distribution systems, computers, telecommunications and data centers, as well as for transportation, lighting, displays, and medical applications among many other areas require high power density and fast response, provide electrical isolation and operate efficiently. In many cases, there is a desire for efficiency at high conversion ratios and/or over wide operating ranges (of voltages and/or powers). There is also a desire to achieve a high degree of integration, manufacturability and reliability. Traditionally, magnetic converter-based architectures with isolation transformers are widely used, such as forward converters, flyback converters and related architectures. Such architectures are simple, low-cost and easy to control. There is, however, a continued trend to operate power converters at ever increasing switching frequencies and as switching frequencies increase the converter timing required in the aforementioned architectures becomes difficult to satisfy, and the parasitic effects significantly increase the loss.

As is also known, circuits using high-gain transformers or coupled inductors is one approach to building converters in these applications. Circuits incorporating tapped inductors can provide desirable duty ratios and reduces device switching stress. However, the leakage inductance of such tapped inductors can ring with the parasitic capacitance of the switches, limiting its feasibility at high switching frequency. High-frequency-link architectures can reduce or eliminate this ringing problem by absorbing parasitics such as transformer leakage inductance into circuit operation. Such circuits can often also realize soft switching and switch at a higher frequency than conventional hard-switched architectures.

Nevertheless, as desired operating switching frequencies keep increasing, parasitic effects which are sometimes ignored, such as the proximity effect loss and transformer parasitic capacitances, can become very important. Furthermore, requirements that a system achieve high performance over wide operating range makes the system design even more challenging.

SUMMARY

In accordance with the concepts, systems, circuits and techniques described herein it has been recognized that new converter architectures and associated controls are required to overcome the aforementioned challenges.

In one aspect, the power conversion circuits and techniques described herein utilize an architecture which incorporates an advanced transformer structure referred to herein as a split-drive transformer (SDT). The SDT structure architecture reduces transformer parasitic effects (e.g. in particular, the effects of parasitic capacitance, although parasitic inductance and resistance characteristics may also exist), and absorbs the transformer parasitics into circuit operation. Reducing, and ideally eliminating, the effect of such transformer parasitic components enables the transformer to operate closer to their ideal transformer characteristics. Moreover, the SDT architecture described herein utilizes the transformer together with a circuit power stage (referred to herein as a power distributor stage) to process the power in multiple voltage domains, and to compress the required operation range of each voltage domain, thus enabling the power converter to work efficiently over wider operation range.

In prior art techniques, the transformer proximity effect and parasitic capacitances set a barrier for increasing the switching frequency of an isolated power converter.

The concepts, circuits, systems and techniques described herein overcome these barriers through use of a system architecture incorporating an advanced transformer structure (e.g. the aforementioned SDT structure) and appropriate inverter and rectifier structures and controls. This approach reduces transformer loss and opens the opportunity of building efficient, isolated power converters capable of operation at switching frequencies which are much higher than that at which conventional designs can operate.

Power converters provided in accordance with the concepts described herein are also capable of operating at higher efficiency and power density than conventional designs.

In one aspect a power conversion circuit includes a distributor and inverter stage coupled to a combiner and rectifier stage through a split drive transformer (SDT) stage which operates to step up/down voltage provided thereto and provide isolation between the distributor and combiner stages. The power distributor and inverter stage has either or both of the following two functions: to receive the overall input power and voltage from a source, condition it and distribute it to multiple paths to interface with the split-drive transformer stage; and/or maintain the variation of its outputs within a narrow range even if its input has relatively variations. This function enables the remainder of the converter to be optimized for a compressed operating range, leading to a higher efficiency of the overall system.

One or more of the following features may be incorporated, individually or in combination and in whole or in part, into various embodiments. In embodiments the power distribution and inverter stage comprises switch and gate drive circuit. In embodiments, the power distribution and inverter stage comprises one or more full or half-bridge switching circuits. In embodiments, the split drive transformer stage receives n ac drive waveforms from the distributor. In embodiments, the split drive transformer stage has an interleaved configuration. In embodiments, the split drive transformer stage is provided having a single-phase balancer configuration (i.e., not an interleaved one) and/or only uses a single phase of the interleaved balancer to synthesize the inverter drive outputs. This would have the advantage of reducing the ac drive amplitudes produced by the inverter cells. In embodiments, the split-drive transformer stage uses magnetic coupling to step up/down the voltage and provide isolation.

In embodiments, the combiner and rectifier stage are provided having parallel coupled outputs. In embodiments, the combiner and rectifier stage are provided having series coupled outputs.

In embodiments, the combiner and rectifier stage are provided having half bridge switching cells. In embodiments, the combiner and rectifier stage are provided having full bridge switching cells In embodiments, a switched-capacitor SDT converter (SCSDT converter) is provided having a centralized rectifier. In embodiments, the SCSDT converter is provided having a self powered gate drive scheme for one or both of the power distribution and inverter stage and the combiner stage.

In embodiments, the SCSDT converter includes a level selection circuit (LSC) on the distributor side. In embodiments, the SCSDT converter includes a level selection circuit (LSC) on the combiner side. In embodiments, the SCSDT converter includes a level selection circuit (LSC) on both the combiner and distributor sides. In embodiments, the LSC is provided as a shift inductor level selection circuit (SILSC).

In embodiments, the SCSDT power conversion circuit is provided having a single input and selectable output. In embodiments, the SCSDT power conversion circuit is provided having a selectable input and a single output.

In embodiments, the SCSDT power conversion circuit is provided as a unity power factor ac-dc converter. In embodiments, the SCSDT power conversion circuit is provided as a unity power factor ac-dc converter. In embodiments, the SCSDT power conversion circuit is provided as a dc-ac converter.

In embodiments, a switched-capacitor split-drive transformer (SCSDT) power conversion circuit includes a power distributor and inverter stage comprising n inverter and charge transfer cells. In one embodiment the inverter and charge transfer cells comprise decoupling capacitors, charge shuffling capacitors and 4n switches.

In embodiments, each of the n inverter and charge transfer cells comprises one or more decoupling capacitors ($C_B$); 2n-2 charge shuffling capacitors ($C_S$ 4n switches ($S_w$).

BRIEF DESCRIPTION OF THE DRAWINGS

Features and advantages of the concepts, systems and techniques disclosed herein will be apparent from the following description of the embodiments taken in conjunction with the accompanying drawings in which:

FIG. 6A is a diagram which illustrates an architecture of a series connected power combiner;

FIG. 6B is a schematic diagram of an illustrative implementation of a series connected power combiner having the architecture shown in FIG. 6A.

Figure 1:
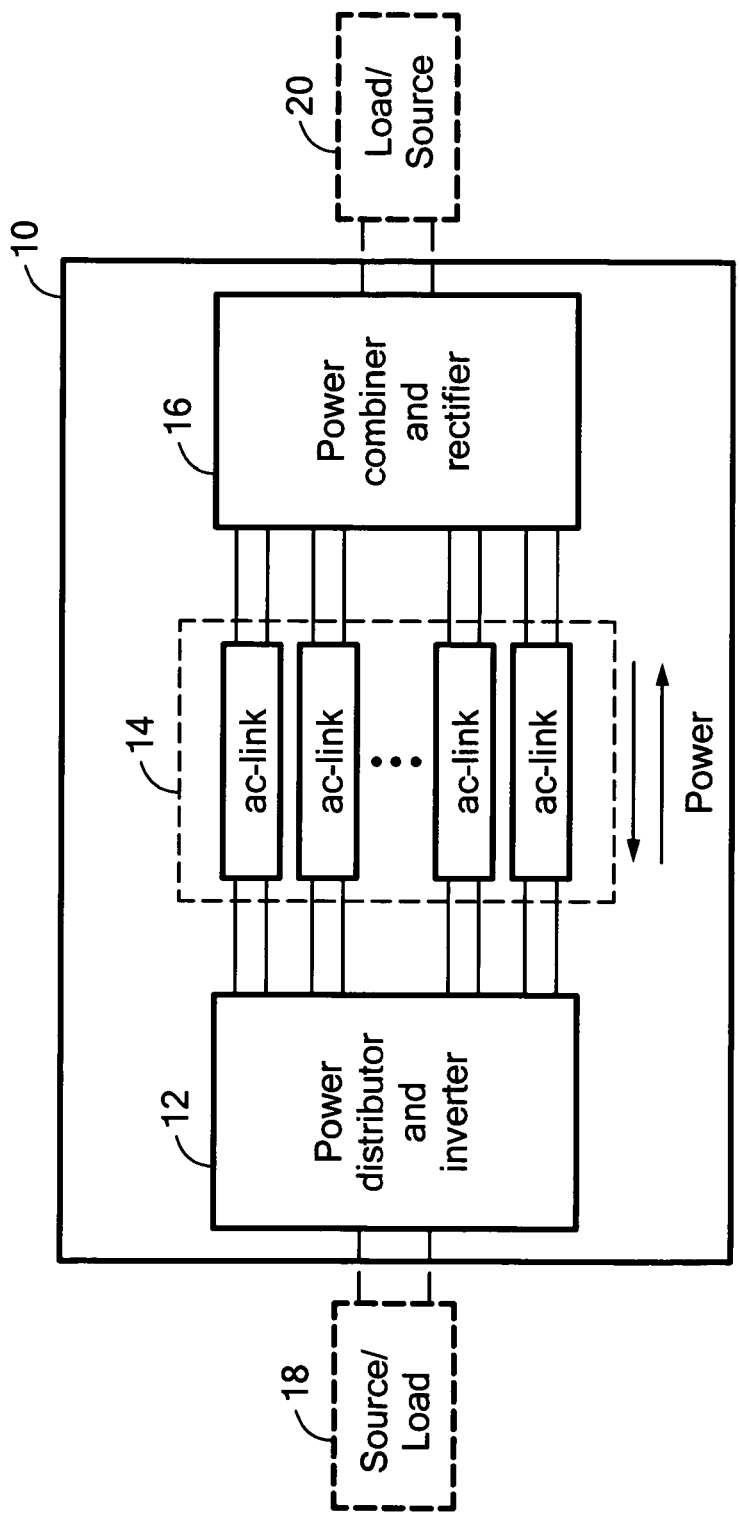
FIG. 1 is a block diagram of a power conversion circuit having a switched-capacitor split-drive transformer (SCSDT) power conversion architecture.

The drawings are not necessarily to scale, or inclusive of all elements of a system, emphasis instead generally being placed upon illustrating the concepts, structures, and techniques sought to be protected herein.

DETAILED DESCRIPTION

The features and other details of the concepts, systems, circuits and techniques sought to be protected herein will now be more particularly described. It will be understood that any specific embodiments described herein are shown by way of illustration and not as limitations of the disclosure. The principal features of this disclosure can be employed in various embodiments without departing from the scope of the concepts sought to be protected. Embodiments of the present disclosure and associated advantages may also be understood by referring to the drawings, where like numerals are used for like and corresponding parts throughout the various views.

Referring now to FIG. 1, an architecture for a power converter 10 includes a power distributor and inverter stage 12, a split-drive transformer (SDT) stage 14 and a power combiner and rectifier stage 16. SDT stage 14 includes a transformer structure having at least one magnetic flux linkage driven by multiple independent sources.

The power distributor (i.e., splitter) and inverter stage 12 has either or both of the following two functions. One function is to receive the overall input power and voltage from a source (e.g. from source/load 18-here shown in phantom since it is not properly a part of the power converter 10), condition it and distribute it to multiple paths to interface with the split-drive transformer stage 14. This includes, for example, taking input at a low frequency (e.g., dc, 60 Hz ac, etc.) and inverting the input into multiple sets of high-frequency ac drive waveforms that can interface with the transformer stage 14. Is should be noted that since converter 10 may operate in either direction, elements 18 and 20 are each indicated as source or loads (i.e. when element 18 is a source, element 20 is a load and vice-versa).

The other function of power distributor and inverter stage 12 is to maintain the variation of its outputs within a narrow range (e.g., voltage range) even if its input has relatively variations. Theoretically the architecture can handle arbitrary wide voltage range (0%-100%). In practical systems, a range of about 25% to about 100% (e.g. about 1:4) can be achieved. This may reflect partial or complete preregulation of the voltages of this stage. This function enables the remainder of the converter to be optimized for a compressed operating range, leading to a higher efficiency of the overall system.

As noted above, SDT stage 14 is provided having a single magnetic flux path and receives a plurality of signals (e.g. preregulated voltage signals) at an input thereof from power distributor and inverter stage 12. SDT stage 14 functions to step up/down the signal level (e.g. voltage level) and electrically isolate the power distributor and inverter 12 from power combiner and rectifier 16 such that variations in a respective one of power distributor and inverter 12 or power combiner 14 do not affect operation and/or performance of the other.

Power combiner and rectifier 16 receives the signals (e.g. voltages) provided thereto from SDT stage 14 and combines the signals into an output provided to a load/source 20 (with load/source 20 being shown in phantom in FIG. 1 since it is not properly a part of the power converter circuit 10).

Detailed examples of illustrative power distributor and inventor stage 12, SDT stage 14 and power combiner and rectifier stage 16 will be provided herein below.

Figure 1A:
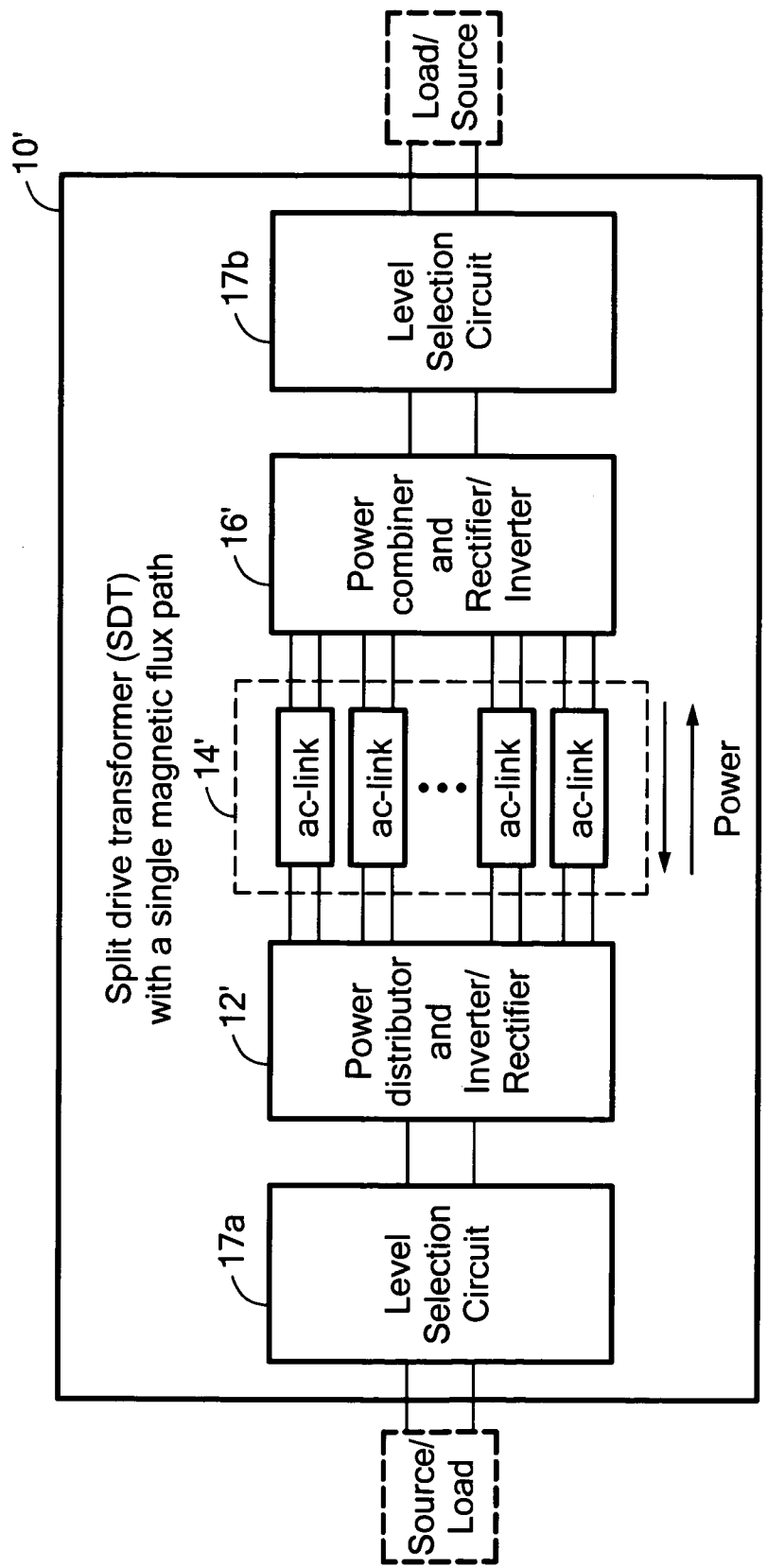
FIG. 1A is a block diagram of a power conversion circuit having a switched-capacitor split-drive transformer (SCSDT) and one or more level selection circuits.

Referring now to FIG. 1A, a power converter 10' includes a first optional level selection circuit (LSC) 17a coupled between source/load 18 and power distributor and inverter stage 12'. Power converter 10' also includes a second, optional LSC 17b coupled between a power combiner and rectifier stage 16' and source/load 20.

LSC circuits each perform a level selection function. The SDT architecture splits the full input voltage range into multiple voltage domains. And the operation mode of the LSC circuit is determined by the domain in which the input voltage locates. For example, in the boost type LSC as shown in FIG. 18B, when the input voltage is between 20V~30V, S1 is controlled to regulate the source of S2 to be 30V. S2 is kept on, and S3 is kept off. When the input voltage is between 30V~60V, S2 is controlled to regulate the source of S2 to be 30V, S1 is kept off, and S3 is kept on. When the input voltage is between 60V~90V, S1 and S2 are kept off, and S3 is controlled to regulate the source of S3 to be 60V. (Other control methods are also applicable).

It should be appreciated that in some embodiments, power converter 10' includes both LSC 17a, 17b while in other embodiments power converter 10' includes only one of LSC 17a, 17b. Whether an input or output LSC is needed depends upon the needs of the particular application. When the application has wide input voltage range (or if it needs to take in and combine multiple input voltages), an input LSC is helpful. When the application has wide output voltage range (or if it needs to supply multiple output voltages), an output LSC will be useful.

Figure 2A:
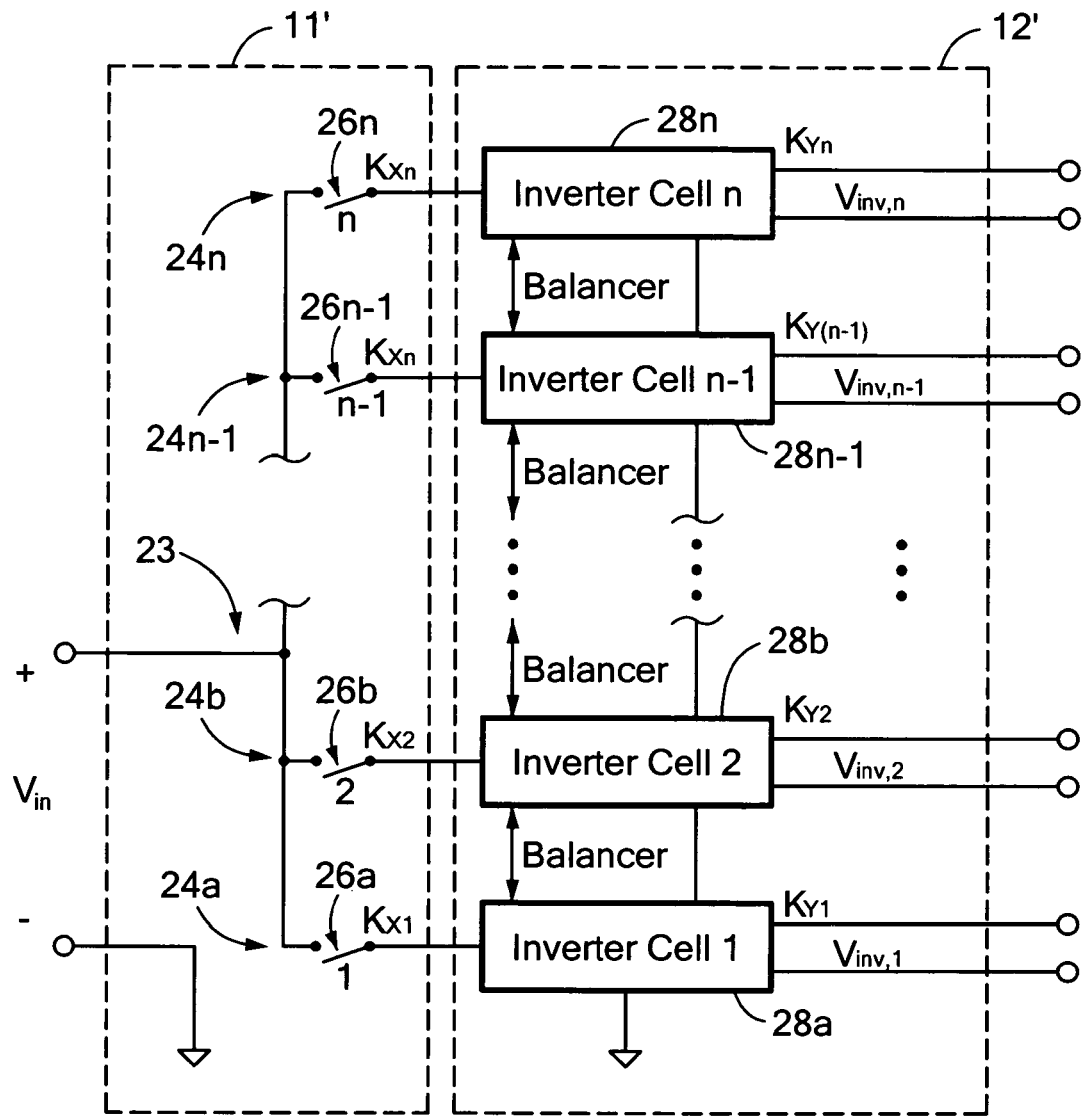
FIG. 2A is a block diagram which illustrates an architecture of a power distributor and inverter stage.

Referring now to FIG. 2A, a level section circuit 11 is coupled to an illustrative switched-capacitor based implementation of a power distributor and inverter stage 12. Level section circuit 11 includes an n-port divider 24 having an input 23 configured to receive an input voltage $V_{in}$. Other implementations (i.e. other than switched—capacitor based implementations) are, of course, also possible. The advantage of an SC implementation is that one can nicely combine and reuse the switches of the SC circuits as half-bridge inverters. This configuration also enables soft switching of all SC switches (in pure SC converters all switches are hard-switched). Whether soft-switching can or cannot be achieved depends, at least in part, upon the power/frequency and the size of the passive components.

Another possible embodiment is to have differential power processing cells as the power distributer/combiner stage. It should, of course, be appreciated that such implementations require multiple magnetic components instead of one. Each of a plurality of divider outputs (here n outputs denoted 24a-24n) may be selectively coupled (e.g. through corresponding ones of switches 26—here n switches 26a-26n) to a corresponding one of a plurality of inverter cells (herein n inverter cells 28a-28n).

Each inverter cell 28a-28n is configured to selectively receive an input voltage at one of n input ports denoted $K_{x1}$-$K_{xn}$ and in response thereto produce an output signal (e.g. an inverted voltage) at a port thereof (e.g. inverted voltages $V_{INV1}$-$V_{INVn}$ at inverter cell ports denoted $K_{Y1}$-$K_{Yn}$. A balancer is coupled between each inverter cell. In the SC implementation, the power balancer is naturally embedded in the ladder SC circuits. The $C_{s4}$ (and other similar "flying capacitors") function as the power balancer in the SC implementation.

One can also use "flying" inductors as power balancer device, and that is more like a resonant SC circuit or differential power processing circuit.

Figure 2B:
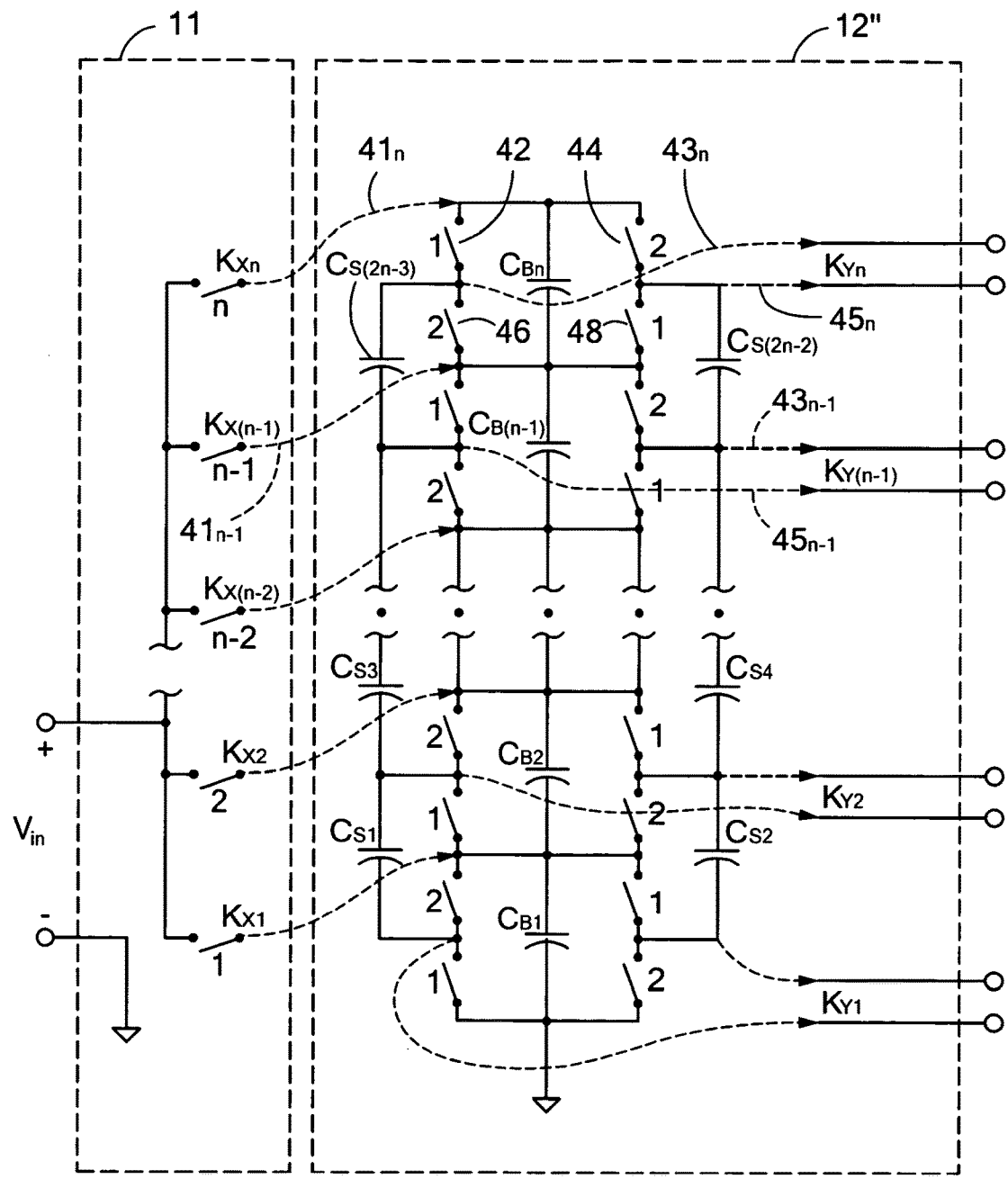
FIG. 2B is a schematic diagram of an illustration implementation of a power distributor and inverter stage having the architecture shown in FIG. 2A.

Referring now to FIG. 2B, a power distributor and inverter stage 12'', which may be the same as or similar to stages 12 and 12' (FIGS. 1 and 2A above) includes n full-bridge inverter and charge transfer cells. Each of the charge transfer cells comprise decoupling capacitors ($C_B$), 2n-2 charge shuffling capacitors ($C_S$) and 4n switches ($S_w$) where n is the number of switching cells. The number of input ports can be any number smaller than the total number of switching cells (inverters) As one function, this stage can act similarly to a two-phase ladder switched-capacitor voltage equalizer, such that all decoupling capacitor voltages $C_B$ are equalized. There are n possible input points ($K_{X1}$-$K_{Xn}$). Assuming the input voltage is $V_{in}$, and the $m^{th}$ intersection ($K_{Xm}$) is selected as the input point (with the other terminal of $V_{in}$ connected to the lowest-potential capacitor terminal), the voltages of inverter cells $C_{B1}$-$C_{Bm}$ will each be $V_{in}/m$. All other capacitors will be maintained at $V_{in}/m$ by the switched-capacitor charge transfer. In some implementations, one may select among any input point, while in others only a single input point may be provided. The number of input points one might select from depends upon a variety of factors including but not limited to voltage ranges to be managed and what subset of the selector switches $K_{n1}$-$K_{nn}$ one implements.

The selection of the input point can be made to depend upon the input voltage. When the input voltage is high, $K_{Xi}$ with larger i is selected to divide the high voltage across more cells. And when the input voltage is low, $K_{Xi}$ with smaller i is selected to divide the voltage across fewer cells. As a result, the output voltage variation is reduced. The input voltage range across each potential input is optimally selected. One optimization goal is to reduce (and ideally minimize) the range over which the cell voltages vary. Other optimization goals are, of course, possible. Other optimization goals are, of course, possible. One needs to make tradeoffs to balance the circuit complexity and performance. Theoretically, a circuit structure with more levels can perform better, with a higher complexity.

Each decoupling capacitor (e.g. capacitor $C_{BN}$) and the four connected switches (e.g. switches 42, 44, 46, 48) form a full-bridge inverter cell providing an ac drive voltage to interface with the split-drive transformer stage. Thus, n ac drive waveforms are provided to the split-drive transformer stage, each of which can be smaller in ac amplitude than would be realized with a single inverter.

It is noted that separate switches and topologies could be used for the voltage balancing function and the inverter function. The ladder SC configuration (all switches and capacitors in FIG. 2B) does the balancing and inverting at the same time. This would provide greater flexibility in topology and operation, e.g., by allowing different phases and switching times of the individual ac drives and/or by allowing different inverter circuit topologies to be applied. However, while desirable in some applications such variations would come at the expense of higher component count.

It is also noted that one could use a single-phase balancer configuration (i.e., not an interleaved one), and/or only use a single phase of the interleaved balancer to synthesize the inverter drive outputs (requiring a blocking capacitor in series with each inverter output). This would have the advantage of reducing the ac drive amplitudes produced by the inverter cells and—in some cases—reducing component count.

In addition to the elements to synthesize the ac waveform, each inverter cell may optionally include elements to provide filtering, voltage transformation, and—in some cases—to provide current sharing among the different inverter outputs. These could be impedance elements (e.g., series resonant tank) or two-port networks connecting between the inverter switch outputs and the transformer inputs (e.g., two-port filter networks or immittance converter networks). Placing an immittance converter network at the output of each inverter cell, for example, would ensure that equal voltages developed at the output of the inverter cells would drive equal currents into the transformer stage. Likewise, a series resonant tank could provide frequency shaping of the voltage at the transformer, provide frequency selectivity for control through frequency control, and provide some series impedance to help ensure current balance among the inverter outputs. Note that portions of such networks could be formed from transformer parasitic elements, such as inter-winding capacitances, leakage inductances, etc.

Figure 3A:
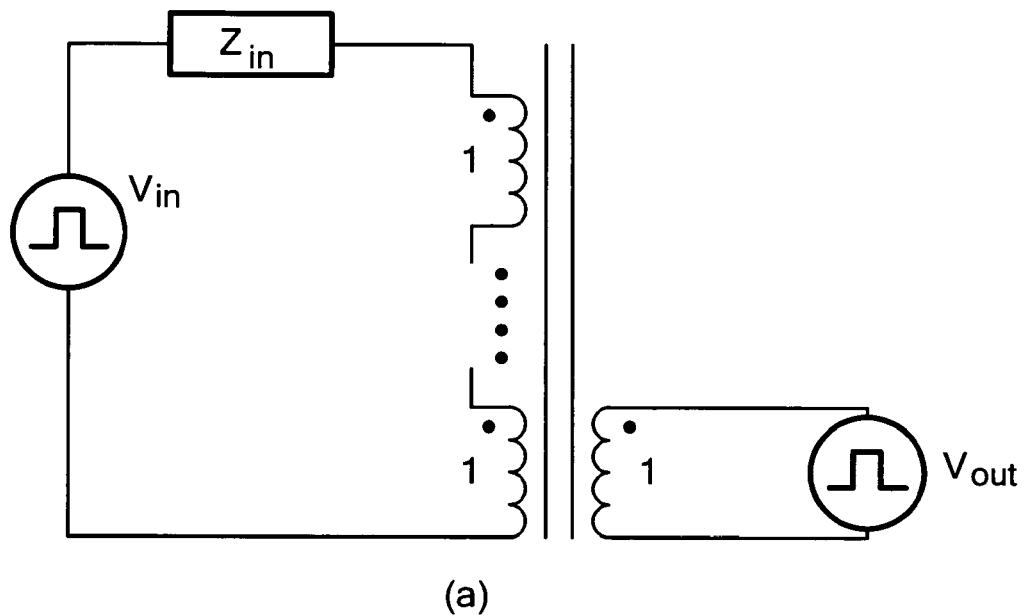
FIG. 3A is a schematic diagram of a conventional single-drive-transformer structure.

As noted above, the SDT stage operates to step up/down voltage provided thereto and provide isolation. In one embodiment, the split-drive transformer stage uses magnetic coupling to step up/down the voltage and provide isolation. In conventional single drive transformer structures, as shown in FIG. 3A the transformer has one primary winding and one secondary winding. In a planar transformer structure, windings may be implemented with flat copper planes stacked close to each other, resulting in significant parasitic capacitance.

Figure 3B:
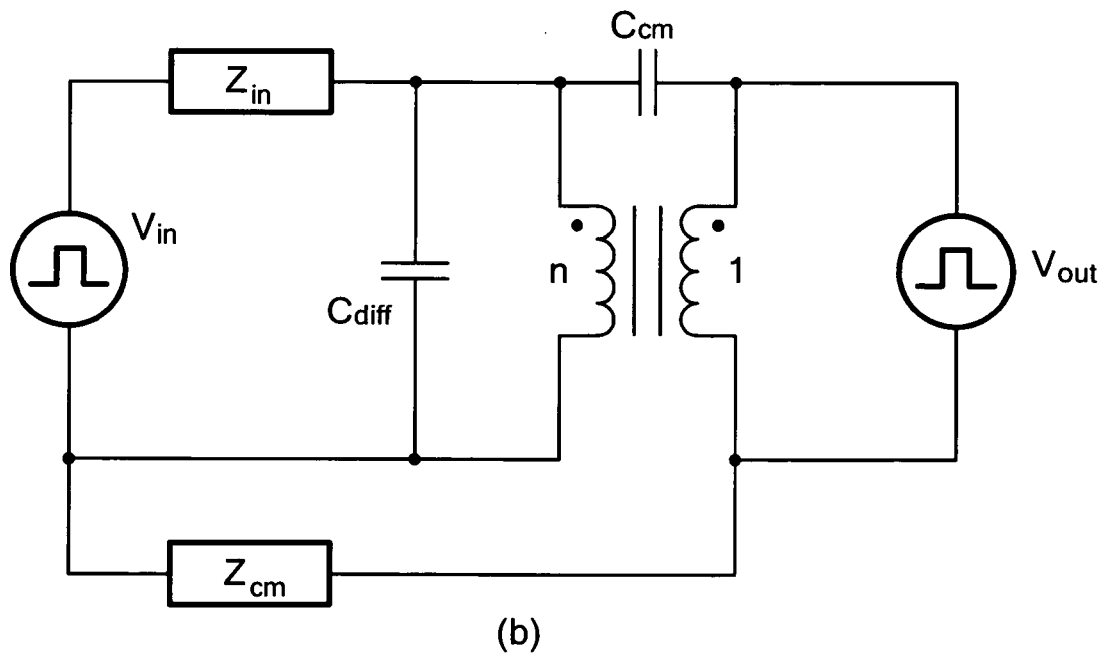
FIG. 3B is a schematic diagram of a parasitic capacitance model for the conventional single-drive-transformer structure shown in FIG. 3A.

Referring now to FIGS. 3A and 3B a conventional single-drive transformer structure and a simplified lumped model of the parasitic components are shown. It should be appreciated that although the conventional transformer of FIG. 1 includes multiple primary windings, they belong to a single current path. The parasitic capacitance between primary windings and secondary windings is modeled as common-mode capacitance ($C_{cm}$). The parasitic capacitance between two primary windings or two secondary windings is modeled as differential-mode capacitance ($C_{diff}$). These capacitances, together with $Z_{in}$ and $Z_{cm}$, form a path for current to flow, which can yield loss. Moreover, the ac flows can distort the intended voltage transformation of the converter. $Z_{in}$ may include impedances provided as part of the distribution stage, while $Z_{cm}$ may include parasitic coupling, such as through the enclosure of the power converter. As switching frequency increases, the effects of these capacitive components become larger, and associated proximity-effect currents induce more loss.

Figures 4A, 4B:
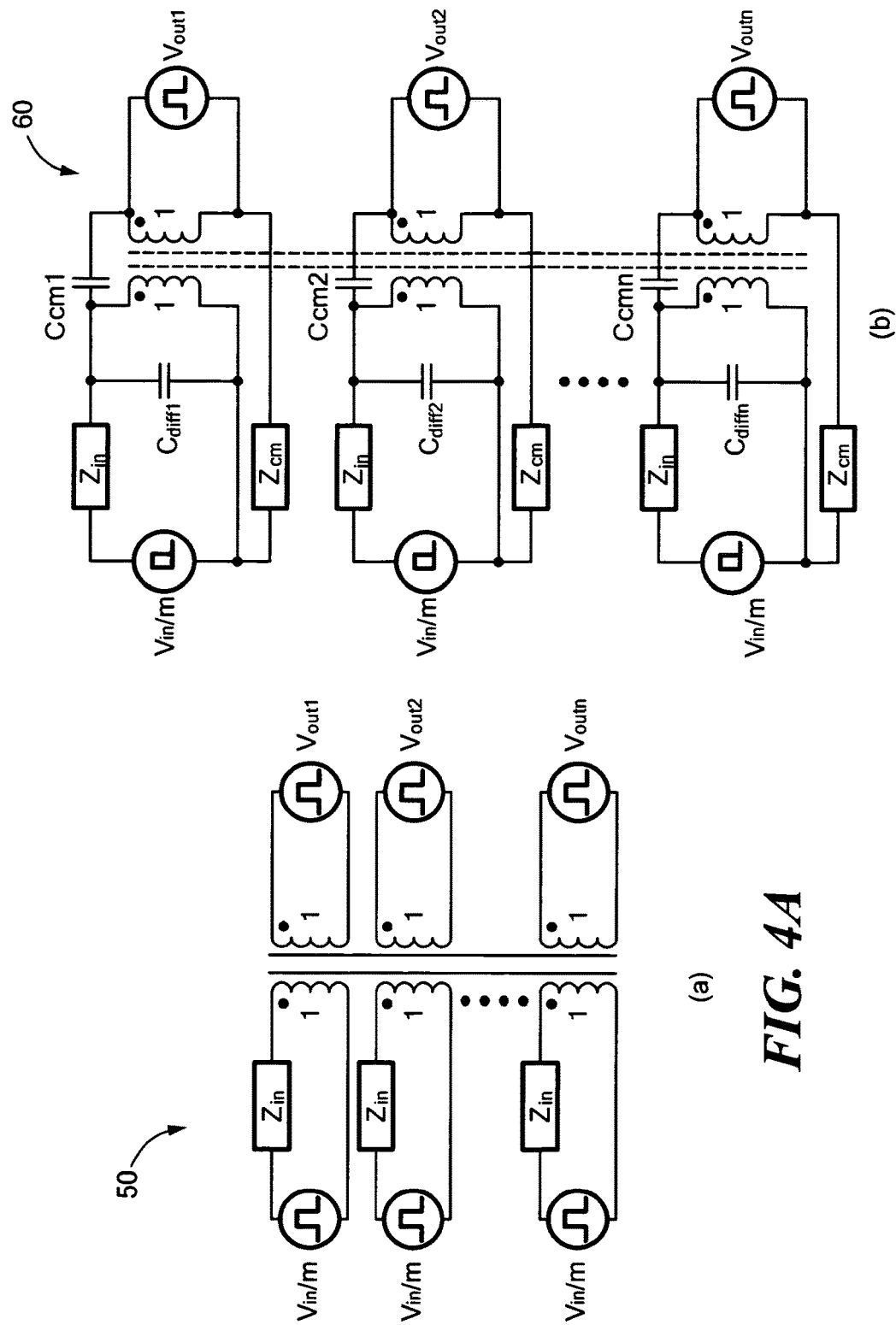
FIG. 4A is a diagram of a SDT transformer structure.
FIG. 4B is a parasitic capacitance model of the transformer structure shown in FIG. 4A.

Referring now to FIG. 4A, a spit-drive transformer structure includes n primary winding sets with the primary of each winding set driven by one of n inverter outputs of a power distributor and inverter stage such as that described below in conjunction with FIGS. 1, 2A and 2B. As described herein, split drive transformer structure corresponds to a transformer structure that has at least one magnetic flux linkage that are driven by multiple independent sources. The SDT structure reduces the loss resultant, at least in part, from the parasitic capacitances described above in conjunction with FIG. 3. This is accomplished by the SDT structure reducing, and ideally eliminating, at least the parasitic capacitances typically associated with a conventional transformer structure.

It should be appreciated that rather than having a single primary winding and a single secondary winding as in conventional approach, the SDT structure described herein has a plurality n primary-secondary winding sets, with the primary of each winding set driven by one of the n inverter outputs of the power distributor and inverter stage. Each winding set provides identical turns ratio, and together they link a single dominant magnetic flux path. As illustrated in FIG. 4B, common-mode capacitances still exists in these winding-pairs, but owing to the distribution of the inverter function in the distribution stage, the common-mode components of the ac voltages driving currents through the capacitances are reduced, thereby reducing the current flows, reducing both loss and the impact on the voltage conversion function of the transformer stage.

Moreover, the split-drive transformer stage may be structured with the different winding sets (e.g., one for each drive input) interleaved. This can significantly reduce proximity effect loss in the transformer. The proximity effect can be significantly reduced by appropriately interleaving the windings. It should be appreciated that it is possible to interleave in a variety of different ways. In many applications, winding resistance and leakage inductance are the main considerations in selecting an interleaving techniques and structures. In some applications, thermal and mechanical constraints may also have a substantial impact in selecting an interleaving techniques and structures. Other factors, may also be considered.

Referring now to FIG. 4B a parasitic capacitance model 60 or the SDT transformer 50 of FIG. 4A includes common mode capacitances $C_{om}$ and differential capacitors $C_{diff}$. It should be appreciated that there are many ways to model, and to reduce the parasitic capacitance.

Figures 5A, 5B:
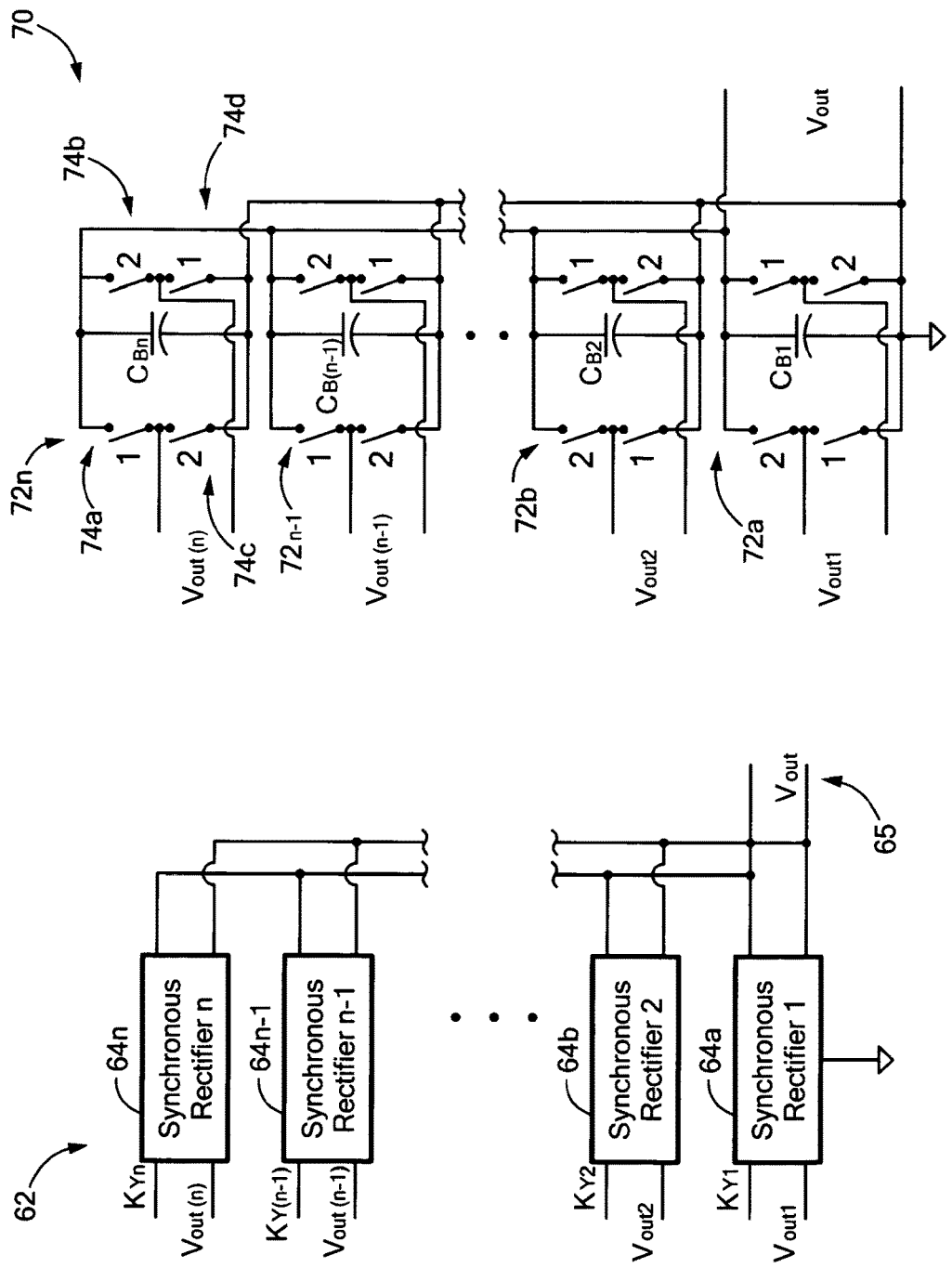
FIG. 5A is a diagram which illustrates an architecture of a parallel connected power combiner.
FIG. 5B is a schematic diagram of an illustrative implementation of a parallel connected power combiner having the architecture shown in FIG. 5A.

Referring now to FIG. 5A, a power combiner and rectifier stage 62 which may be appropriate for use in a power converter such as that shown in FIG. 1 includes a plurality of synchronous rectifiers generally denoted by (here n rectifiers 64a-64n) with each rectifier 64a-64n having an input to accept voltages and outputs at which output voltages are provided. In the embodiment of FIG. 5A the outputs of each synchronous rectifier 64a-64n are coupled in parallel to provide a single output 65. In operation as part of a power converter, the power combiner and rectifier stage combines the n ac outputs voltages of the split-drive transformer stage into a single dc output voltage at terminal 65. If the output voltage is low, taking the secondary windings from the transformer and converting them to dc through synchronous rectifier structures connected in parallel at their outputs.

Referring to FIG. 5B, an illustrative implantation of a power combiner and rectifier stage 70 includes a plurality of synchronous rectifiers 72a-72n. Each synchronous rectifier includes a capacitor (e.g. one of capacitors $C_{B1}$-$C_{Bn}$) and a plurality of switches, here four switches 74a-74d (identified only in conjunction with inverter 72n for clarity). The switches operate to provide the inverting function as is generally known. Usually these switches are controlled symmetrically. Although asymmetric half-bridge inverters may also exist. It is, of course, possible to use frequency control.

Alternatively, if the output voltage is high, series connected output rectifier structure as shown in FIG. 6 fits better. Those of ordinary skill in the art will appreciate that there are many ways of interconnecting rectifier outputs. There are likewise many other possible ways of implementing the power combiners (e.g. half-bridge vs. full-bridge, centralized vs. distributed), allowing tradeoffs to be made. Tradeoffs are usually made between component counts, efficiency, parasitics and size. Tradeoffs also strongly depend on applications.

One function of the power combiner and rectifier stage is to rectify the individual (high-frequency) outputs of the split-drive transformer stage. One may individually rectify the outputs of each of the transformer winding sets and combine their outputs at dc (in series, parallel, or with some other combination). Alternatively, the ac outputs of the transformer stage may be combined and rectified together with a single rectifier structure.

The power combiner stage may also include other elements before the one or more rectifiers. Cascaded with the secondary winding of each transformer winding set, one may optionally include elements to provide filtering, voltage transformation, and—in some cases—to provide current sharing among the different transformer secondaries. These could be impedance elements (e.g., series resonant tank) or two-port networks connecting between the secondary winding outputs and the input(s) to the rectifier(s), such as, two-port filter networks or immittance converter networks. Placing an immittance converter network at the output of each transformer secondary, for example, would ensure that equal voltages developed at the output of the inverter cells would drive equal currents into the transformer stage. Likewise, a series resonant tank could provide frequency shaping of the voltage at the transformer, provide frequency selectivity for control through frequency control, and provide some series impedance to help ensure current balance among the transformer secondaries. Note that portions of such networks could be formed from transformer parasitic elements, such as interwinding capacitances, leakage inductances, etc.

Figure 7:
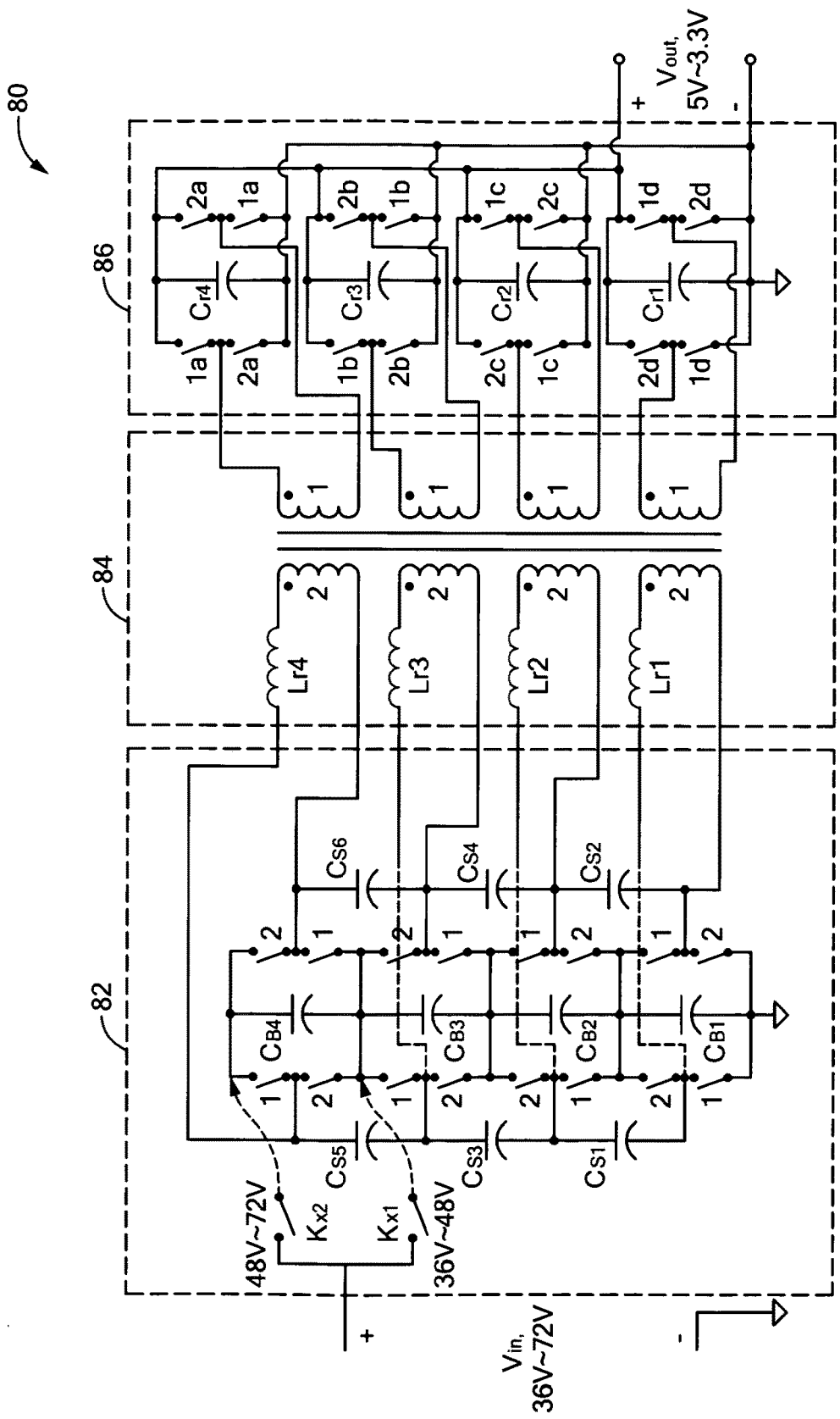
FIG. 7 is a schematic diagram of an example split drive transformer conversion architecture.

Referring now to FIG. 7 an illustrative power converter appropriate for use as a step down dc-dc converter in telecom base station applications. Power converter 80 includes a power distributor and inverter 82, coupled to an SDT stage 84 which in turn is coupled to a power combiner and rectifier stage 86. Power converter 70 is configured to receive voltages in the range of about 36V to about 72V, $V_{in}$ and supply at an output thereof an output voltage $V_{out}$ in the range of about 5V to about 3.3V.

The power distributor has four full-bridge cells and two input options. When 36V<$V_{in}$<48V, $K_{x1}$ is selected as the input; and when 48V<$V_{in}$<72V, $K_{x2}$ is selected as the input. Under this setup, the operating range of each full-bridge cell is between 12V~18V, smaller than the range between 9V~18V if $K_{x2}$ is always used as the input.

Figure 8:
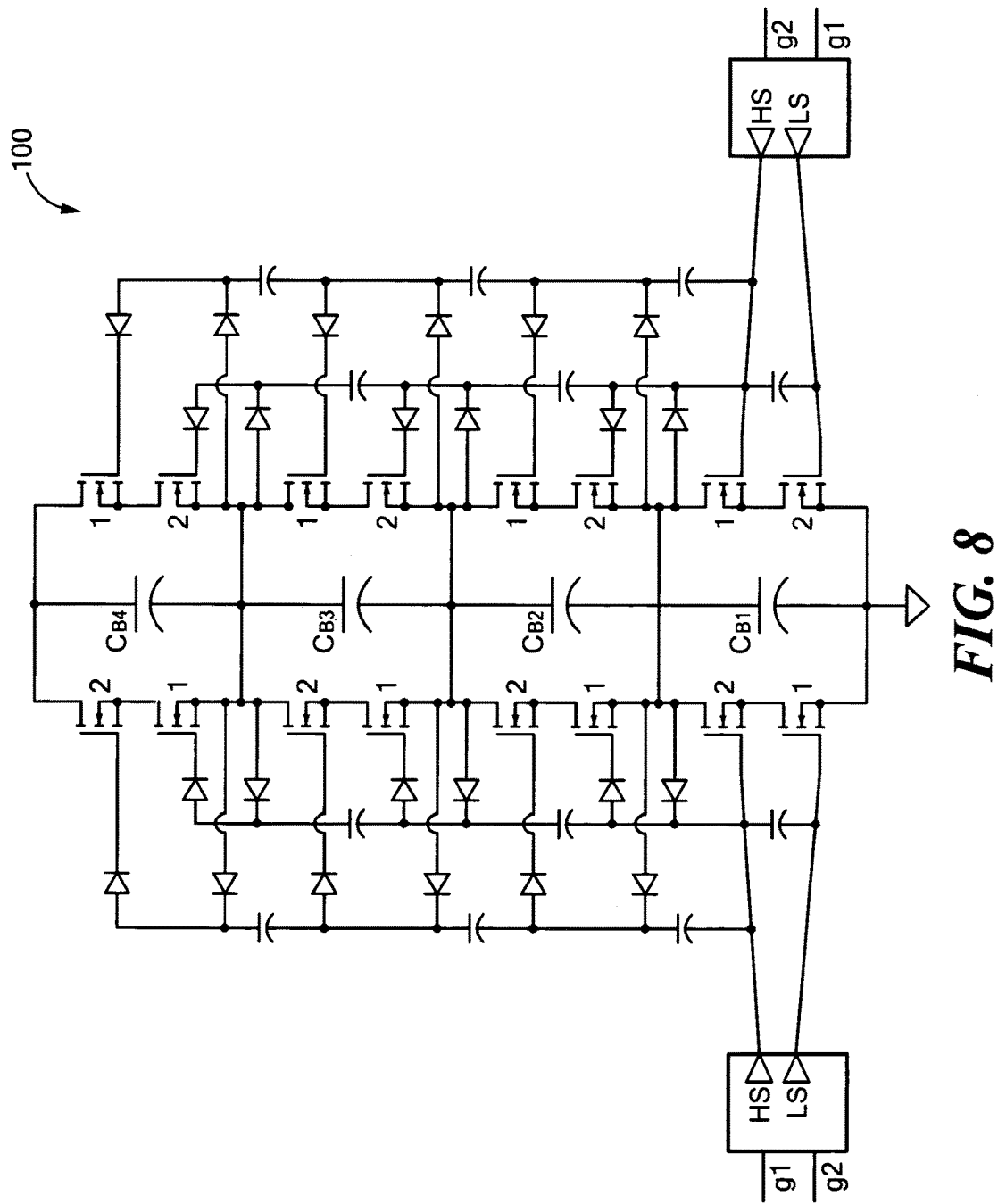
FIG. 8 is a schematic diagram of a switch and gate drive implementation of a power distributor and inverter.

Referring now to FIG. 8, a power distributor and inverter circuit 100 is implemented via gate and switch drive technology. This implementation enables a fully integrated solution of the gate drive circuit. Power for the gate drive circuit is obtained locally, while the gate drive signal is naturally boot-strapped. No additional magnetic/optical coupling is required. A stacked boot-strap structure is selected here, although many other possibilities exist.

Figure 9B:
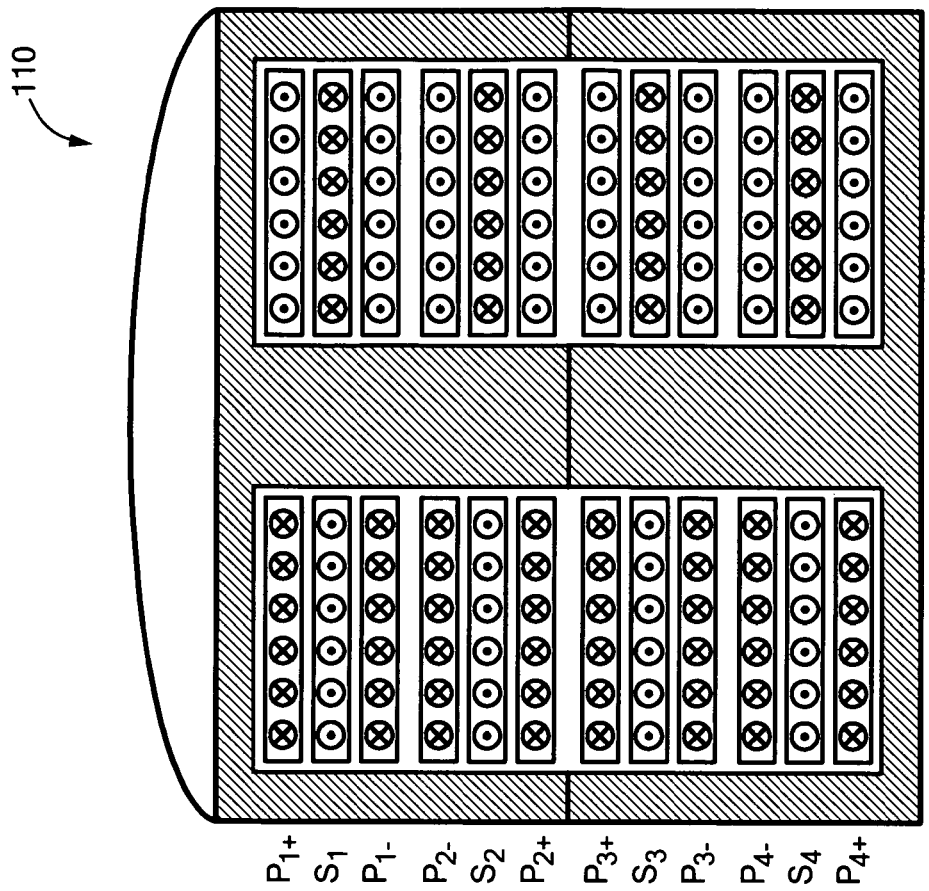
FIGS. 9A and 9B illustrate an interleaved transformer winding structure.
Figure 9A:
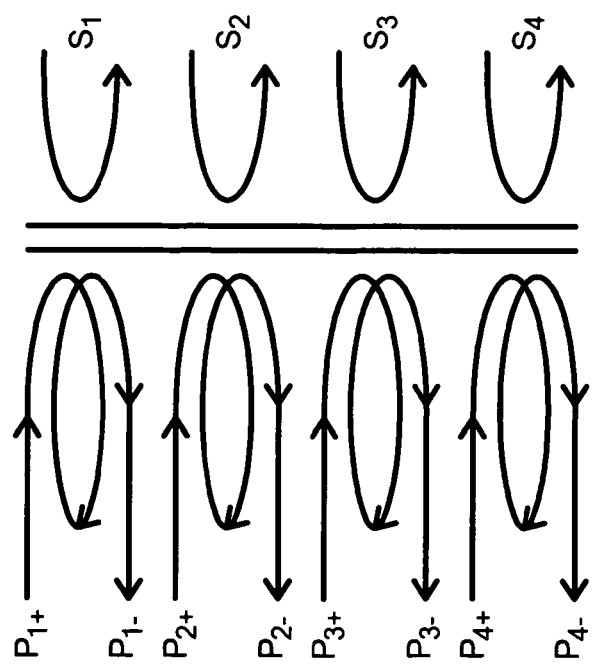

Referring now to FIGS. 9 and 9B, an illustrative transformer structure 110 is shown. The transformer structure of this example design is a 12 layer planar transformer having four 2:1 winding pairs (sets) that dominantly share a single magnetic flux path. In order to reduce the proximity effect, the primary and secondary windings are interleaved (such that each winding set is an interleaved structure). Other interleaving techniques and structures may also be used. The positions and orientations (winding directions) of the sections of the primary windings of adjacent winding sets are positioned in a manner that reduces the the capacitive charge injection from one winding set to another due to the parasitic capacitance between two primary windings. Thus, for example, physically close windings adjacent primaries are laid out such that their individual ac swings are similar, such that capacitive charge injection from one set primary winding to another set primary winding is reduced. This implementation also uses the leakage inductances of the transformer, $L_{r1}$~$L_{r4}$, (e.g., the leakage inductance between the primary and secondary of each winding set) as an impedance for power control and for helping to ensure current sharing among winding sets.

Figure 10:
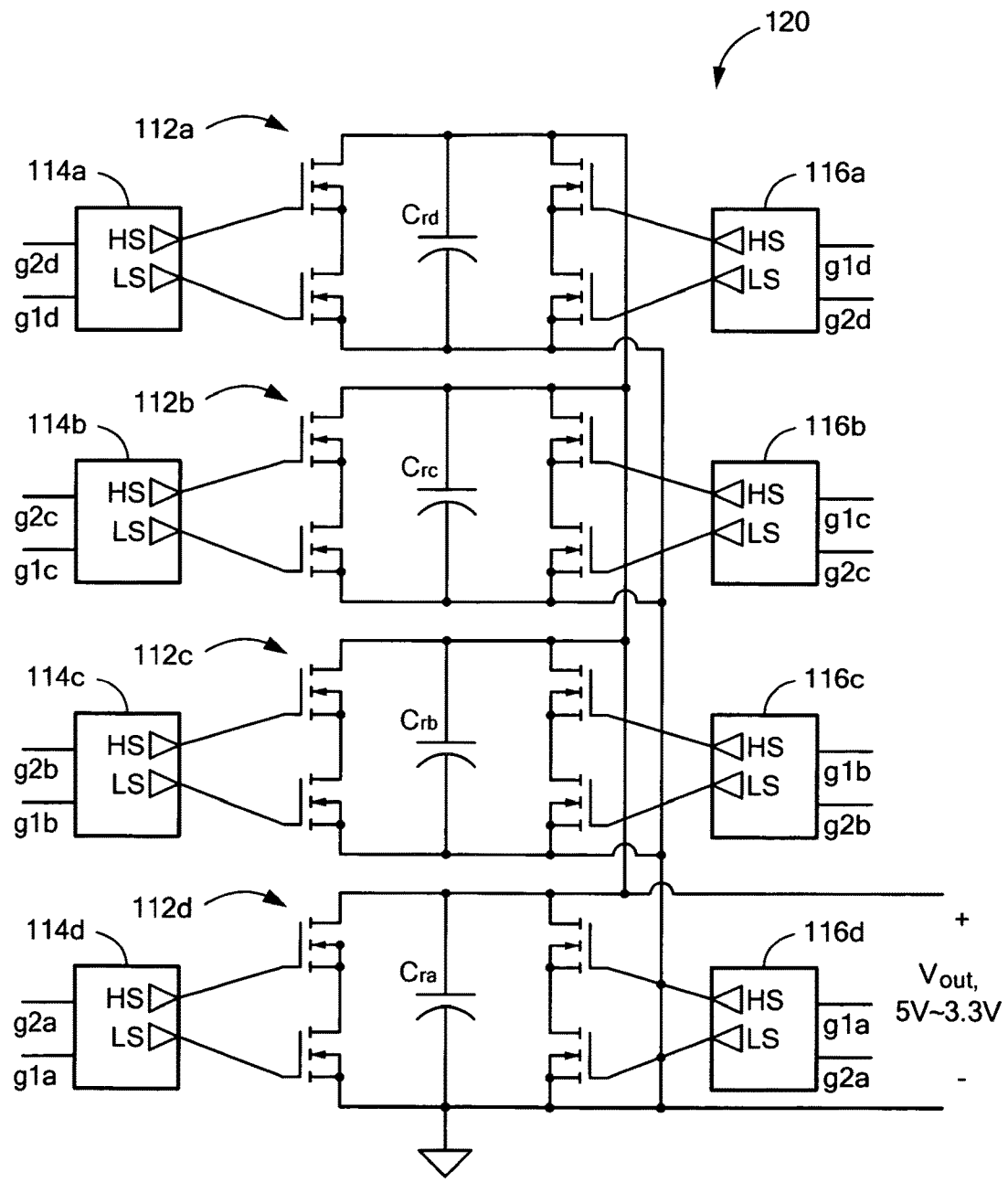
FIG. 10 is a schematic diagram of an illustrative switch and gate drive implementation of the power combiner.

Referring now to FIG. 10, a power combiner and rectifier stage 120 includes four full bridge synchronous rectifiers 112a-112d connected with their outputs in parallel. This stage uses eight half-bridge gate drives 114a-114d and 116a-116d to control the different rectifiers 112a-112d independently; and applies phase-shift control to balance one or more of power and current among the multiple transformer winding sets. This control handle can also be used to determine where magnetizing current flows in the transformer, helping to mitigate proximity effect. Likewise, frequency control or net phase control between the power divider and inverter stage and the power combiner and rectifier stage can be used to control total power flow and regulate the system output. Other control means, such as on-off control can likewise be used to regulate the system output.

The voltage regulation of the proposed converter architecture can be implemented in multiple ways, depending upon the selected impedance controlling component. For example, if the impedance controlling component is an inductor (e.g., using the primary-to-secondary leakages of the individual winding sets as impedances for power control), the net power flow through the converter can be controlled in a manner similar to a dual-active-bridge (DAB) converter with phase-shift control. If an additional series capacitor is provided, such impedances could be used to form a set of series resonant tanks, and the net power flow in the converter could be controlled in a manner similar to that of a series-resonant converter combining frequency control and phase shift control. Both the DAB and the series resonant converter enable ZVS of all the switches.

After reading the broad concepts disclosed herein, one of ordinary skill in the art will appreciate that there are many extensions of the proposed SDC architecture, allowing tradeoffs to be made. Several examples are presented here as conceptual introductions.

One alternate implementation of the SCSDT power conversion architecture is described below in conjunction with FIG. 11.

Figure 11:
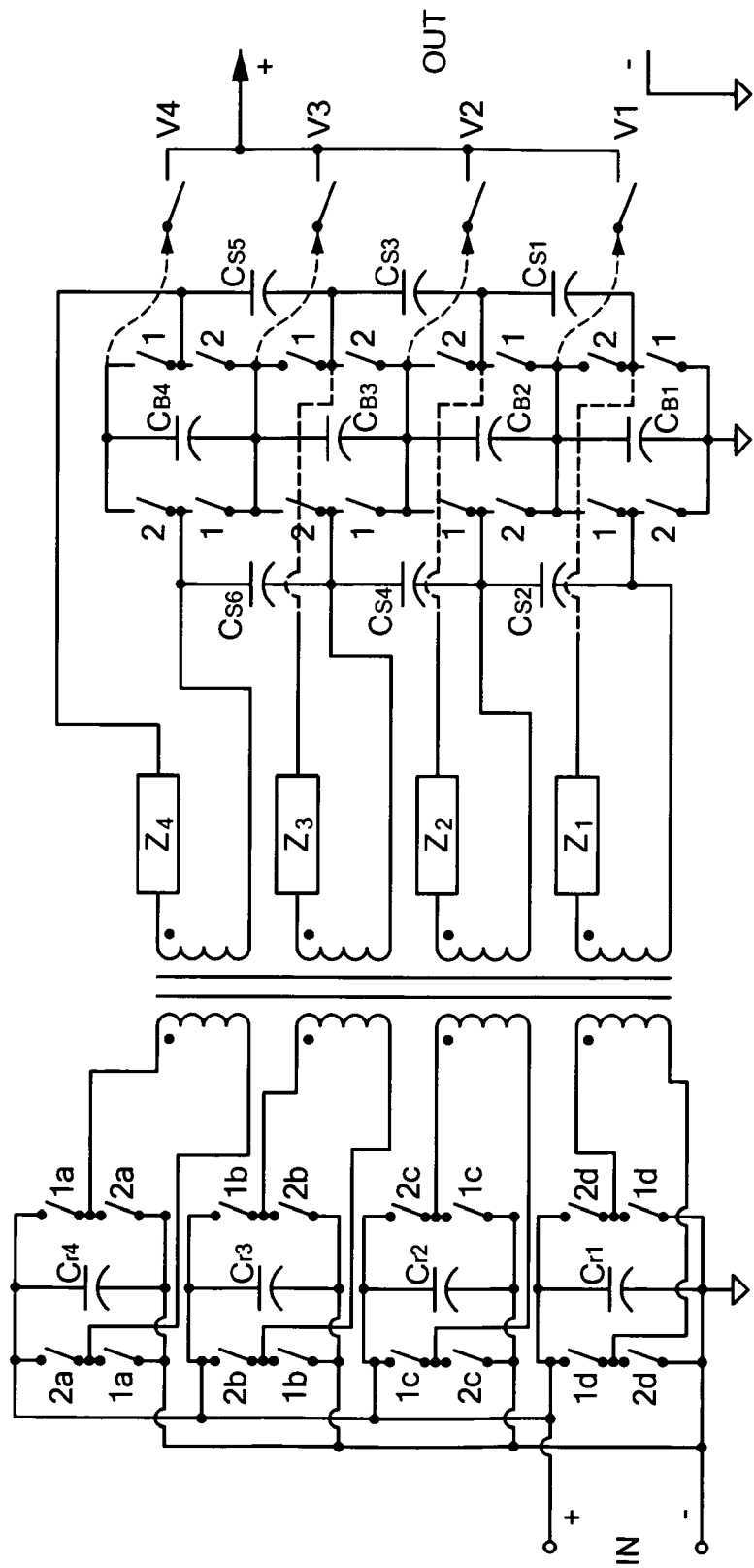
FIG. 11 is a schematic diagram of an illustrative implementation of the SCSDT power conversion architecture with single input and selectable output.

Referring now to FIG. 11, an implementation of the SCSDT power conversion architecture which "flips" the inputs and the outputs of the illustrative circuits and systems described herein is shown. That is, FIG. 11 shows a power conversion circuit using the SCSDT power conversion architecture having a single input and selectable output.

It should be noted that, in general, the architecture illustrated in FIG. 11 may flow power in either or both directions as compared to the above description, with circuit structures used appropriately as inverters and rectifiers, respectively. Four substantially identical high-frequency-link converters drive a split-drive transformer having a single dominant magnetic flux path, followed by a converter structure incorporating switched capacitor voltage equalizer which combines the power. One can select from among the voltages of this structure to provide an output voltage.

Figure 12:
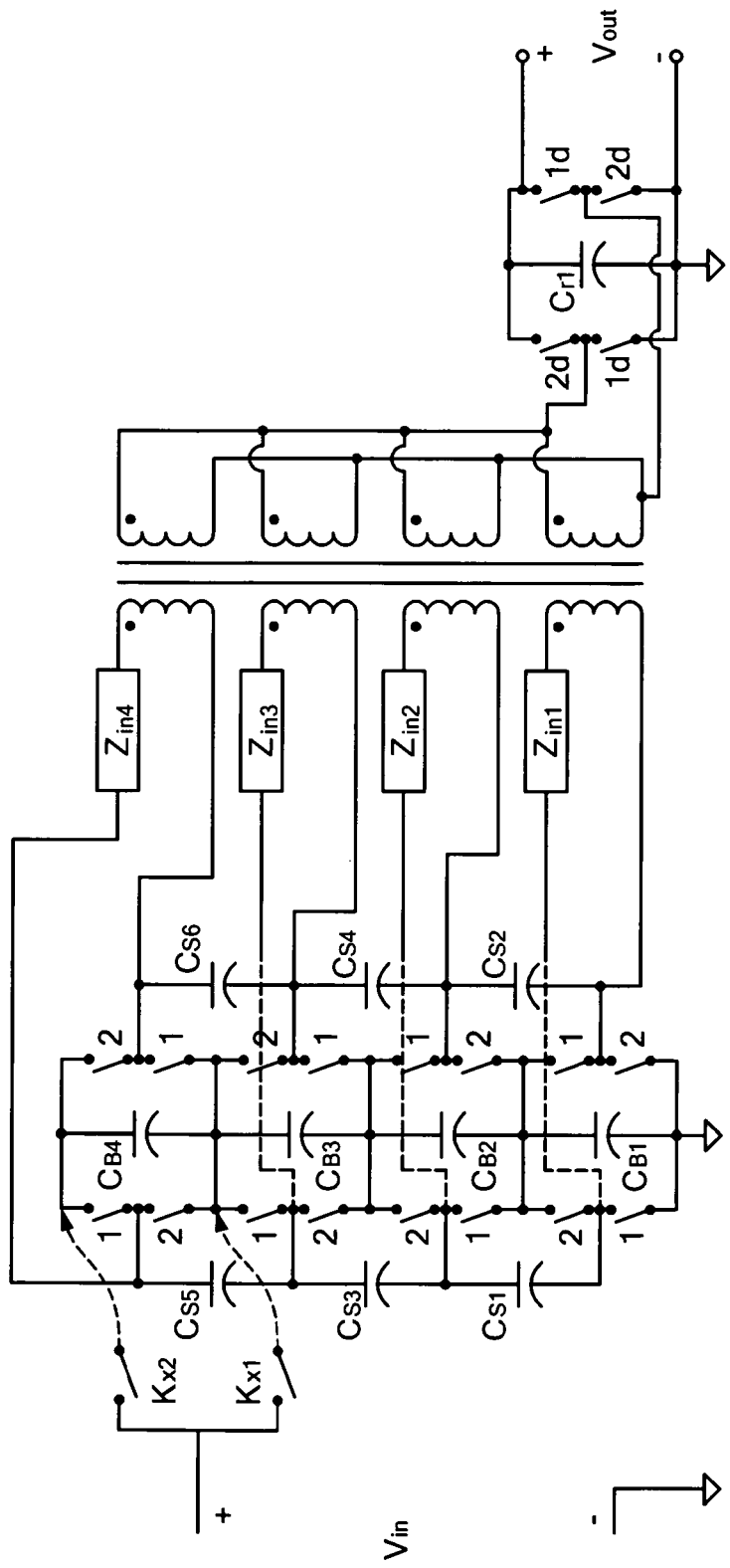
FIG. 12 is a schematic diagram of a SDT power conversion architecture with centralized rectification.

Referring now to FIG. 12, a converter having an SCSDT architecture includes a centralized rectification stage. Instead of rectifying the outputs before combining them, this implementation combines outputs in ac and rectifies them in a centralized rectifier.

The power distributor and inverter and power combiner and rectifier stages may be implemented with other topologies. Half bridge inverters and half-bridge rectifiers may also be utilized in this architecture, for example, as illustrated in FIG. 13.

Figure 13:
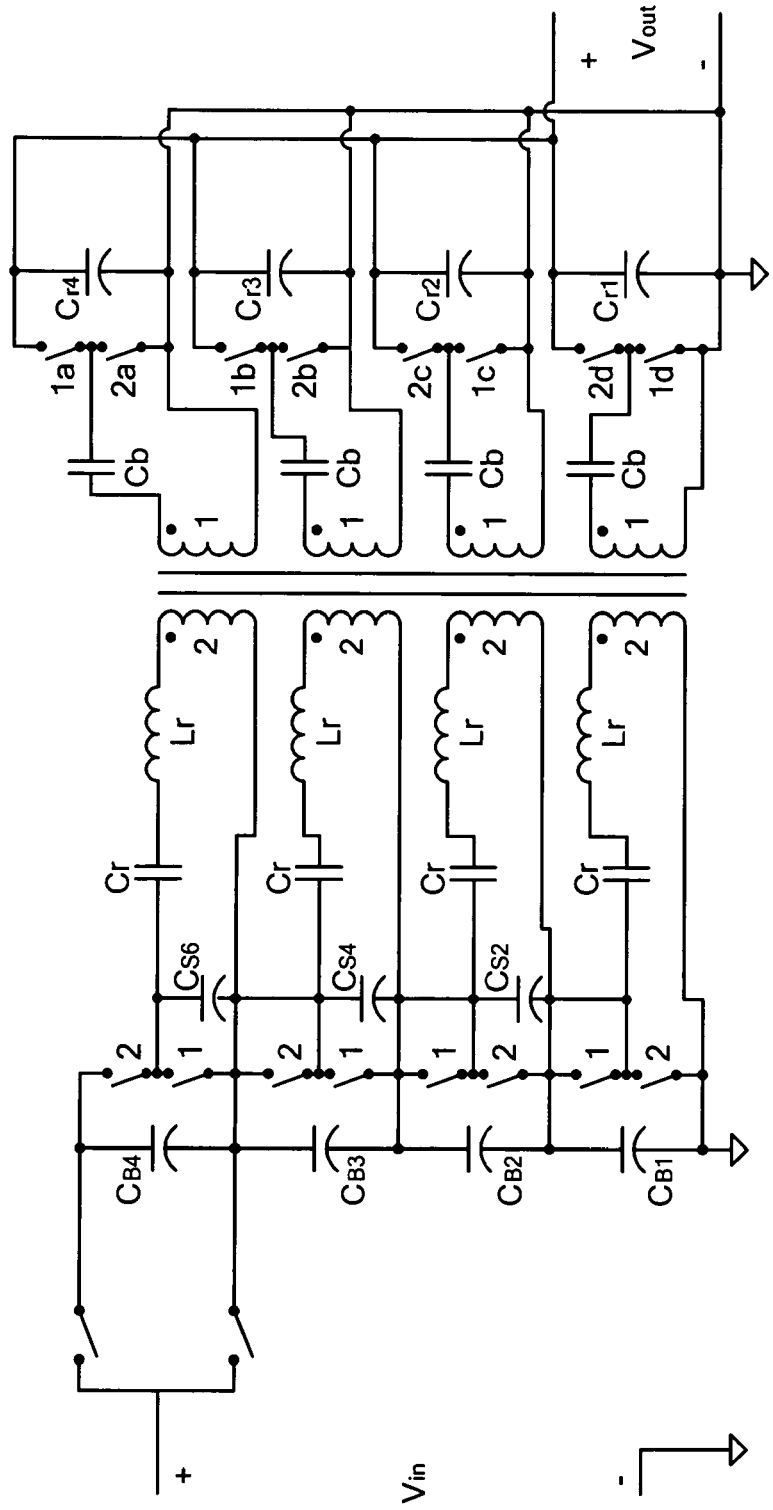
FIG. 13 is a schematic diagram of a SDT power conversion architecture with half-bridge switching cells as both inverter and rectifier.

Referring now to FIG. 13, a PAL power conversion architecture includes half-bridge switching cells.

Figure 14:
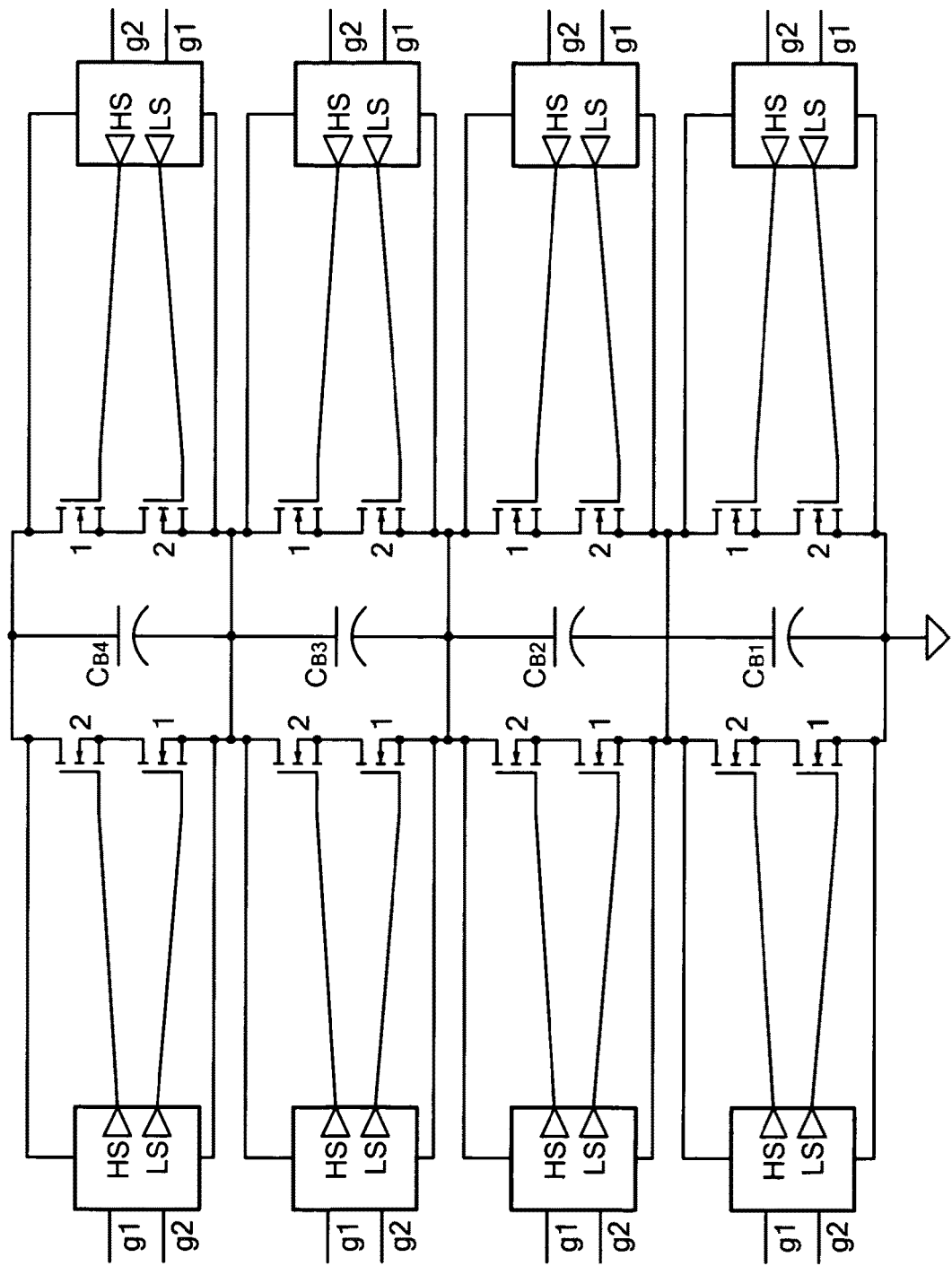
FIG. 14 is a schematic diagram which illustrates a self-powered gate drive technique for a power distribution and inverter stage such as the power distribution and inverter stage describes above in conjunction with FIG. 1.

Referring now to FIG. 14 a power converter having the SCSDT architecture includes a self powered gate drive structure for the power distribution and inverter stage. The self-powered gate drive structure shown in FIG. 14 becomes appealing when the voltage range of each of the full-bridge cells is between 5V~15V range (assuming a MOSFET implementation) since in this voltage range each half-bridge gate drive is powered from the corresponding bypass capacitors, eliminating the requirement auxiliary isolated power supplies. Other voltage ranges may be used for implementations other than MOSEFT implementations.

Figure 15:
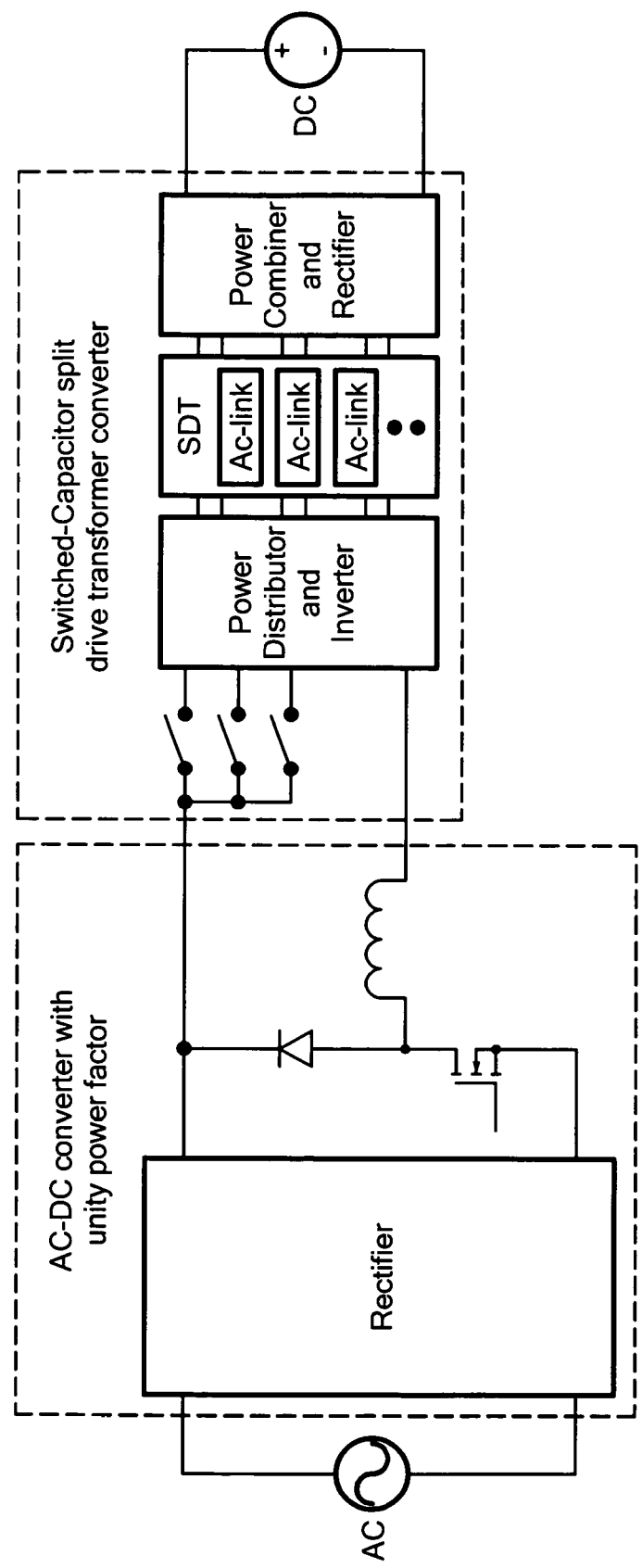
FIG. 15 is a block diagram of a unity power factor ac-dc converter that uses the SCSDT power conversion architecture.

Referring now to FIG. 15, shows the architecture of a unity power factor ac-dc converter that uses the SCSDT power conversion architecture. This could also be extended to be a dc-ac inverter by reversing the power flow direction and making appropriate changes to each stage. The major change to accomplish this is that the user needs to make sure the switch polarity is correct (if all switches are bidirectional, then no modification is needed). The other modification is to select the appropriate transformer turns ratio.

Figure 16A:
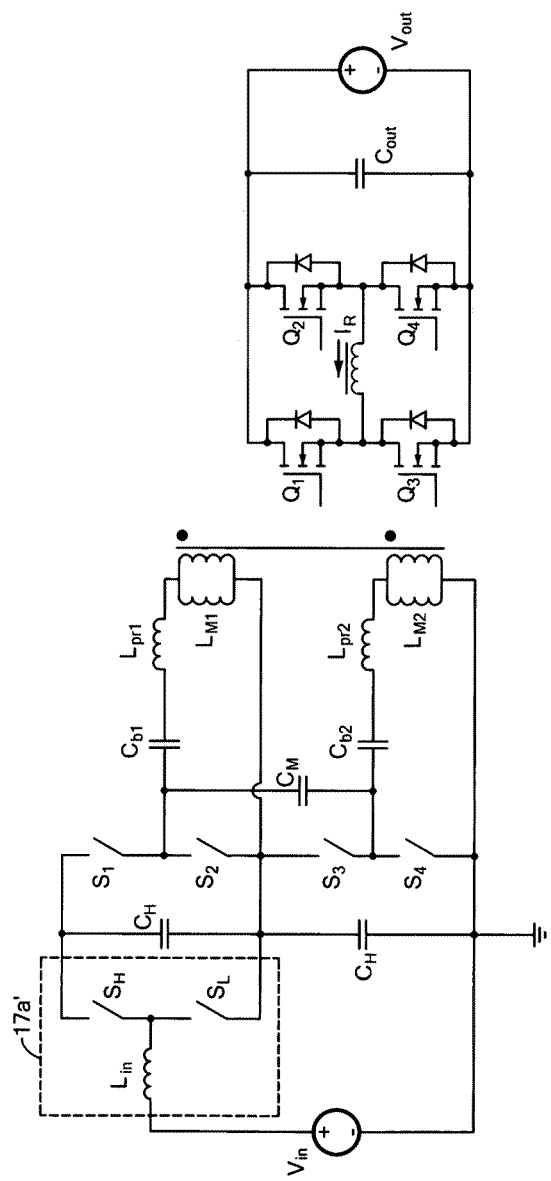
FIG. 16A is a schematic diagram of a shift inductor level selection circuit on the input side.

FIG. 16A is a schematic diagram of a shift inductor level selection circuit (SILSC) 17a' which may be the same as or similar to SILSC 17a described above in conjunction with FIG. 1A. This SILSC has one inductive element (here illustrated as an inductor $L_{in}$) and two switching elements (here, illustrated as single pole-single throw switches $S_H$, $S_L$ although other switching elements could also be used). The inductive element functions as an energy storage device and carries the input current. The two switching elements redistribute the current into two ports of the switched capacitor circuit. The duty ratio of the two switches is controlled such that the voltage at the two output node are regulated to the desired voltage.

Figure 16B:
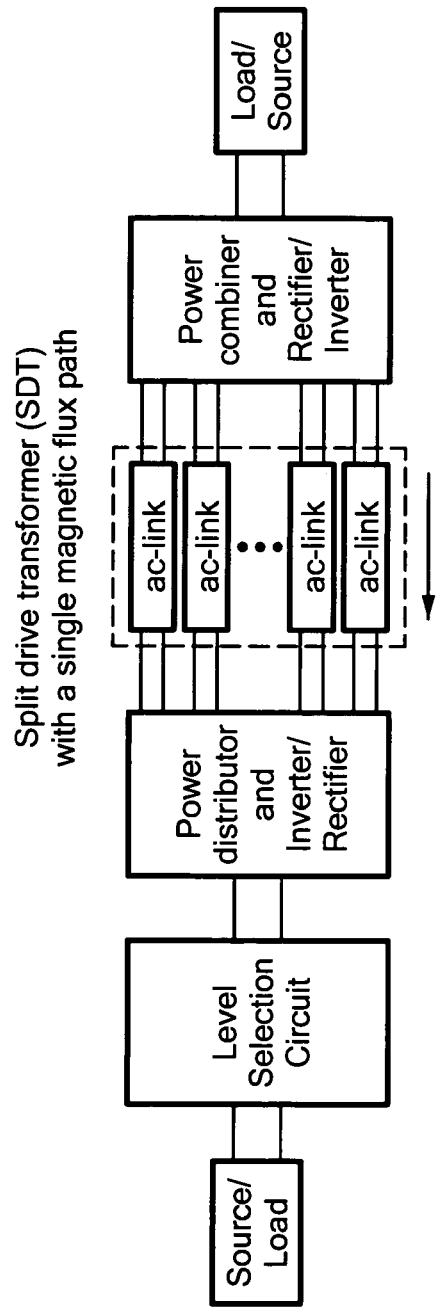
FIG. 16B is a block diagram of a power conversion circuit having a level selection circuit on one side only.

FIG. 16B is a block diagram of a power conversion circuit having a single level selection circuit. In this design, the output LSC is not needed because the circuit shown in FIG. 16A is designed for a regulated single output voltage application.

Figure 17:
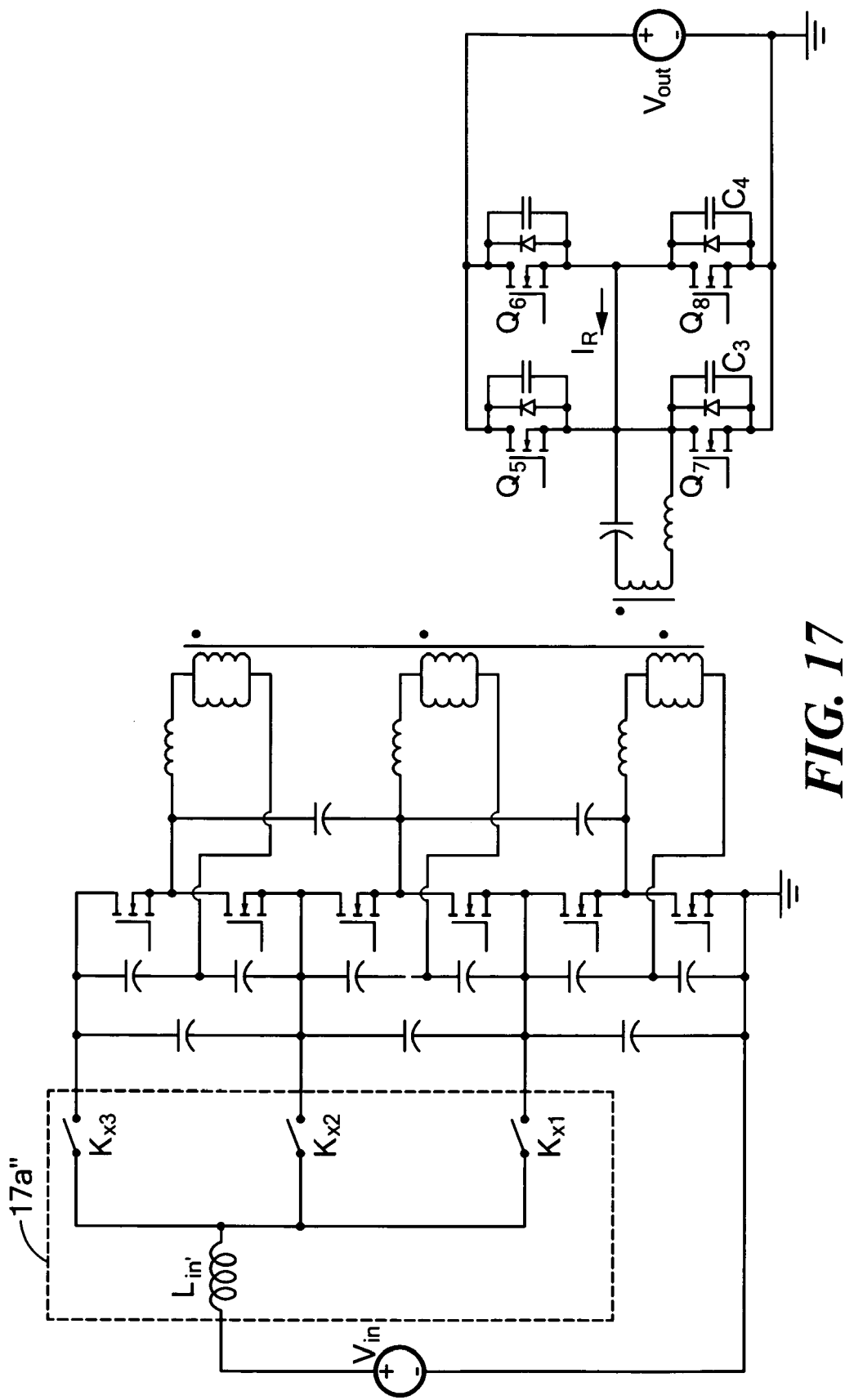
FIG. 17 is a schematic diagram of a shift inductor level selection circuit.

FIG. 17 is a schematic diagram of at least a portion of a power converter circuit which includes shift inductor level selection circuit 17a'' which may be the same as or similar to SILSC 17a described above in conjunction with FIG. 1A. SILSC 17a'' has one inductive element (here illustrated as inductor $L_{in}'$ and three bidirectional switching elements (here illustrated as three bidirectional switches $K_{X1}$, $K_{X2}$, $K_{X3}$). The switch states of the three switches depend on the input voltage.

Figure 18A:
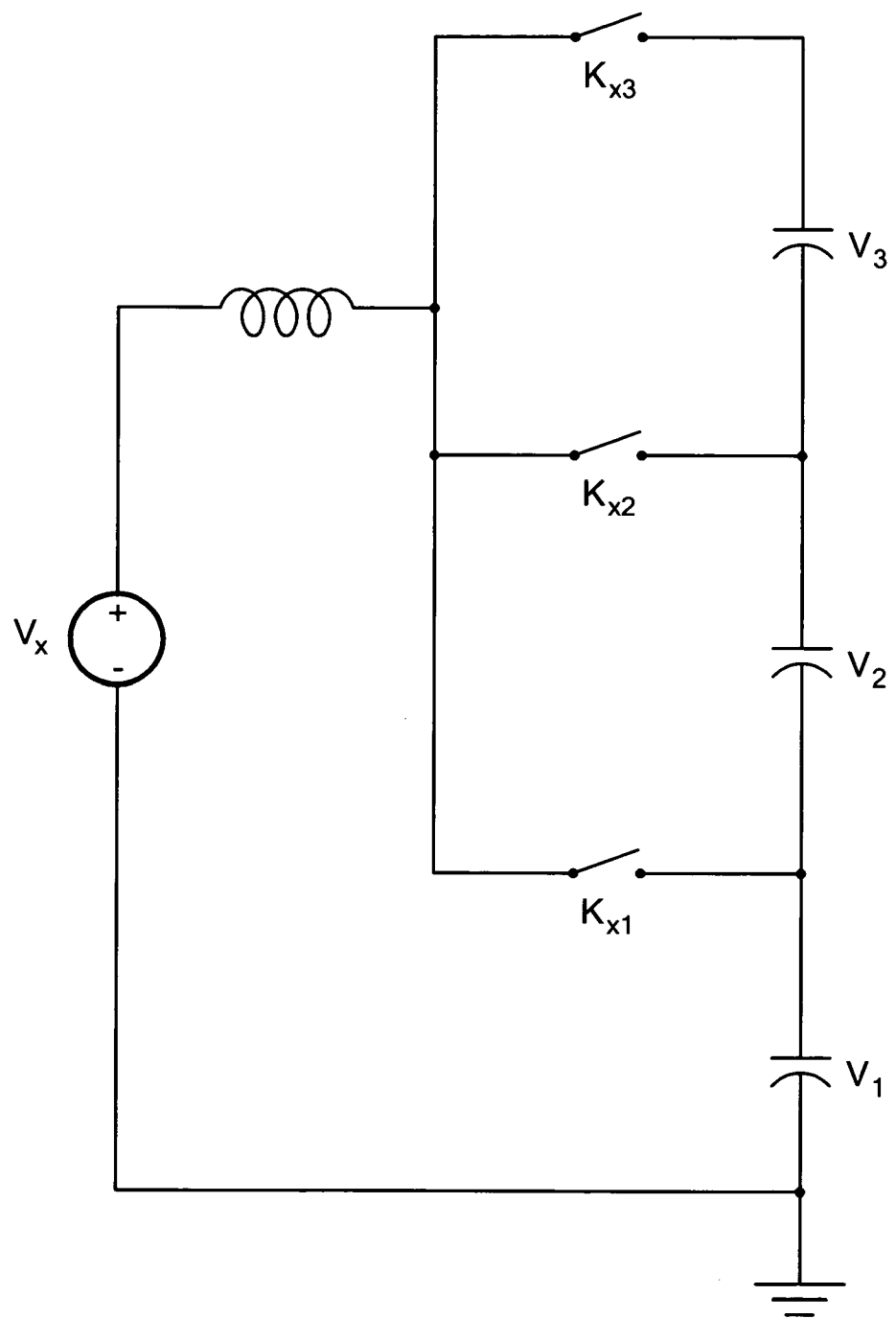
FIG. 18A is a boost type shift inductor level selection circuit having boost converter cells as level selectors.
Figure 18B:
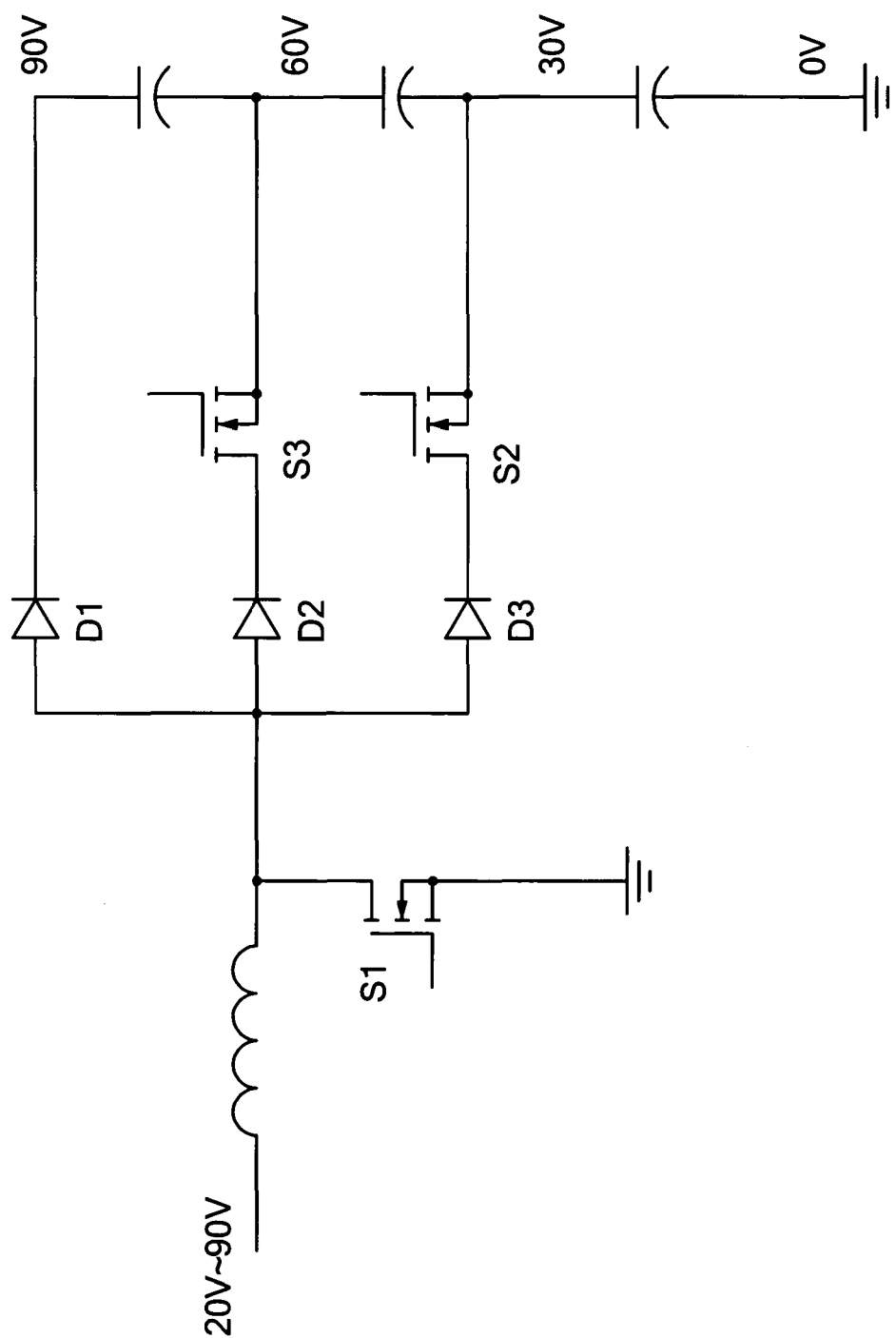
FIG. 18B is a schematic diagram of a level selection circuit having boost converter cells as level selectors.

FIG. 18A is a boost type shift inductor level selection circuit having boost converter cells as level selectors. The maximum voltage that the current feed in is higher than the highest input voltage.

FIG. 18B is a schematic diagram of a level selection circuit having boost converter cells as level selectors as described above.

Figure 19A:
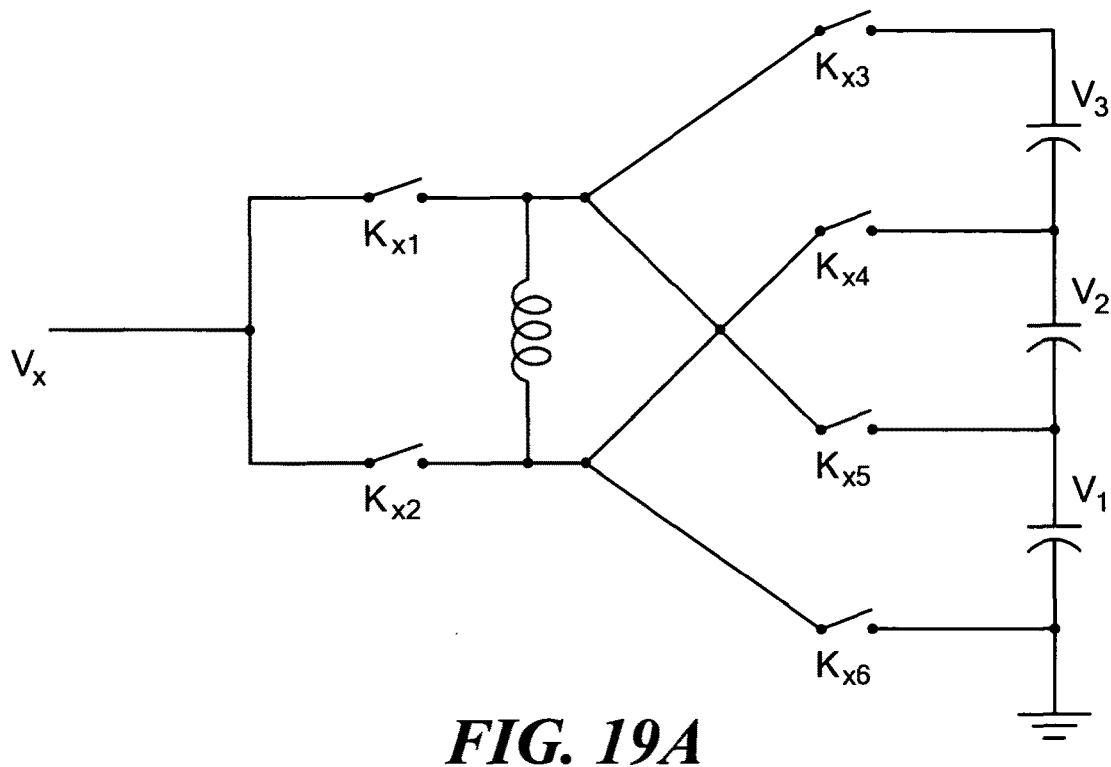
FIG. 19A is a buck type shift inductor level selection circuit having buck converter cells as level selectors.

FIG. 19A is a buck type shift inductor level selection circuit having buck converter cells as level selectors. The maximum voltage that the current can feed in from is lower than the highest input voltage.

Figure 19B:
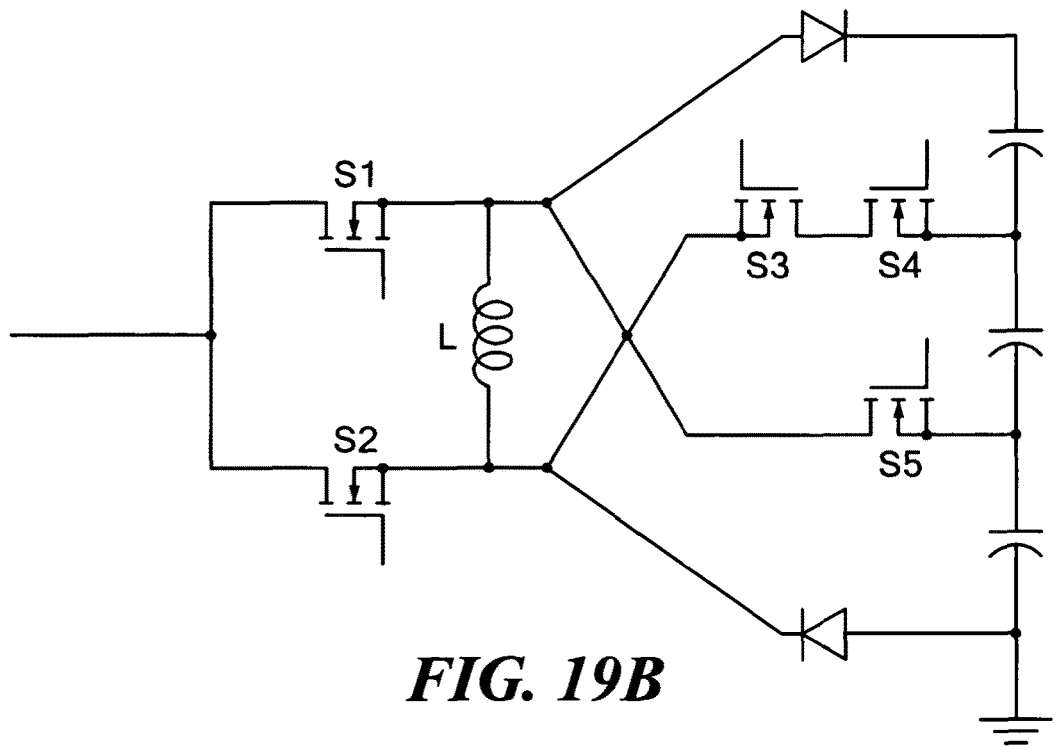
FIG. 19B is a schematic diagram of a level selection circuit having buck converter cells as level selectors.

FIG. 19B is a schematic diagram of a level selection circuit having buck converter cells as level selectors. When V1<Vx<V2, Kx2, Kx6 are switched as a half bridge, Kx5 is kept on, and all other switches are off. In this manner, Kx2, Kx6 and the inductor function as a buck converter. When V2<Vx<V3, Kx1, Kx5 are switched as a half bridge, Kx4 is kept on, and all other switches are off. In this manner, Kx1, Kx5 and the inductor function as a buck converter. When V3<Vx, Kx2, Kx4 are switched as a half bridge, Kx3 is kept on, and all other switches are off. In this manner, Kx2, Kx4 and the inductor function as a buck converter.

Figure 20:
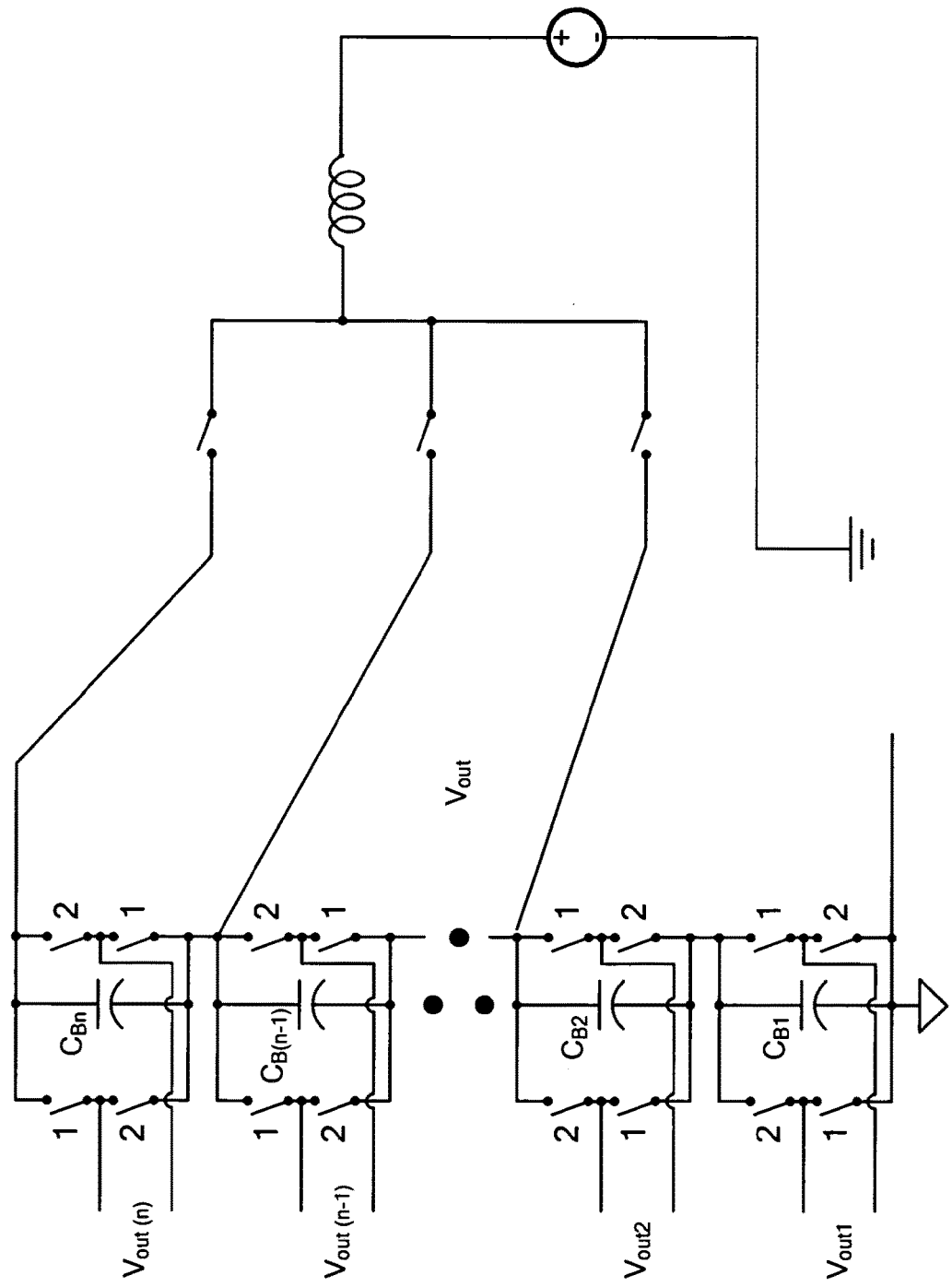
FIG. 20 is a schematic diagram of a level selection circuit configured to be coupled on an output side of a power converter circuit.

FIG. 20 is a schematic diagram of a level selection circuit configured to be coupled on an output side of a power converter circuit. By reconfiguring the output switches, the output voltage can be any value larger or equal to the minimum voltage of the three connected node, and smaller or equal to the maximum voltage of the three connected node.

Figure 21:
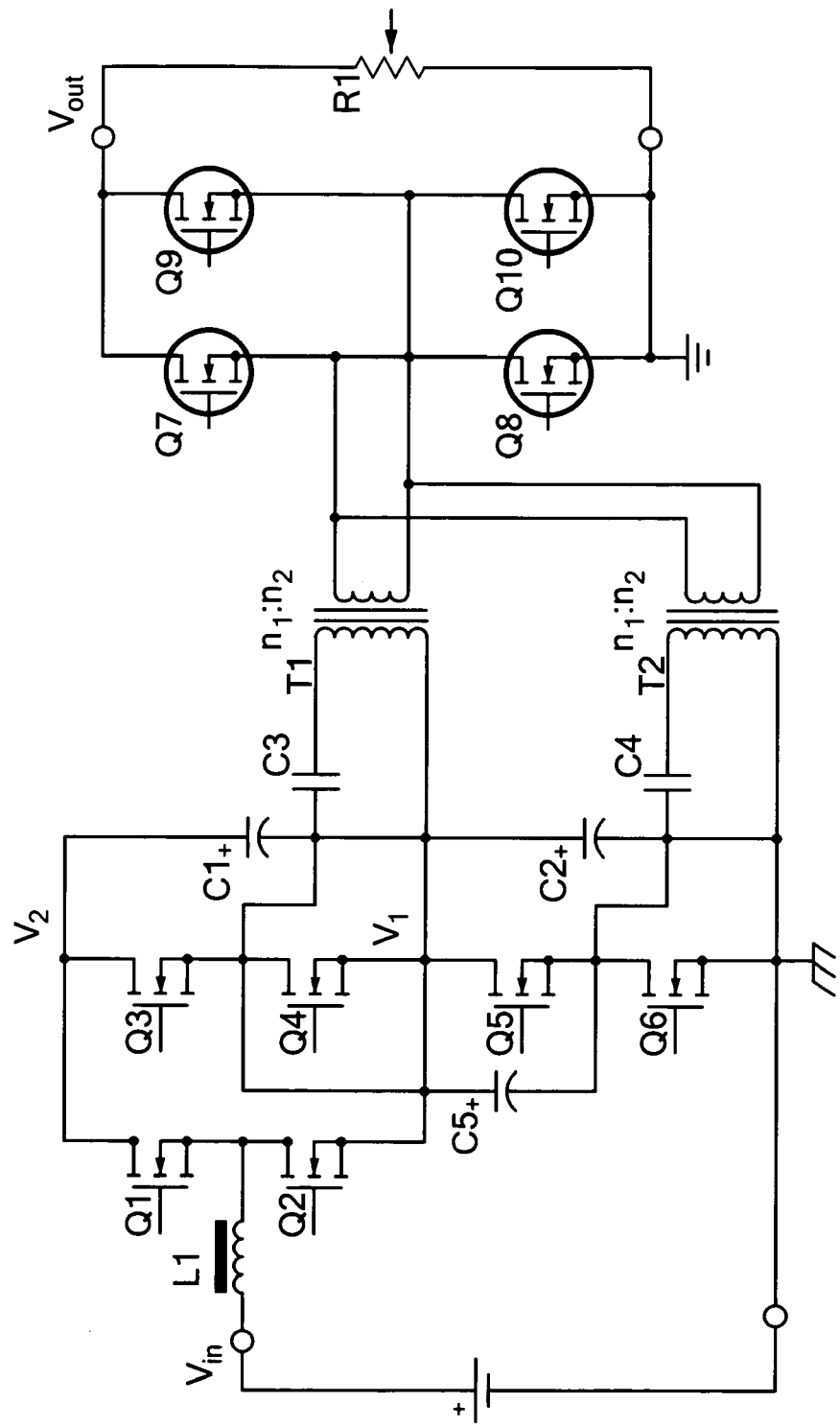
FIG. 21 is a schematic diagram of an example variable-input fixed-output two-voltage-domain switched-capacitor split-drive-transformer power converter.

Referring now to FIG. 21 an illustrative variable-input fixed-output two-voltage-domain switched-capacitor split-drive-transformer power converter includes a boost-type level selection circuit on an input side. Boost-type level selection circuit comprises a pair of switching elements (here illustrated as transistors Q1, Q2) and an inductive element (here illustrated as an inductor L1). Coupled to the level selection circuit is a two level power splitter and inverter provided from transistors Q3, Q4, Q5, Q6 and capacitors C1, C2, C5. It should be appreciated that while this illustrative embodiment shows elements Q1-Q10 as transistors, any type of switching element having suitable characteristics may be used. Similarly, any type of inductive element may be used in place of the inductors and any type of capacitive element may be used in place of the capacitors.

A pair of dc blocking elements, here illustrated as capacitors C3, C4, are coupled between the power splitter and inverter and a first side of a split drive transformer. The dc blocking capacitors C3, C4 are selected having capacitance values to prevent the transformer from saturation.

In this illustrative embodiment, the split drive transformer is provided having two primary windings and two secondary windings. The primary to secondary transformer turns ratio is n1:n2 (T1, T2). A centralized full bridge rectifier provided from switching elements (here, illustrated as transistors Q7, Q8, Q9, Q10) is coupled between a second side of the split drive transformer and a load R1.

In operation, transistors Q3, Q4 are operated as a half bridge with a 50% duty ratio. Transistors Q5, Q6 are operated as a half bridge with a 50% duty ratio. The voltages of C1, C2 and C5 are equal to each other. As a result, V2=2×V1.

It should be appreciated that in this illustrative embodiment, the input voltage Vin should be larger than V1 and smaller than V2, V1<Vin<V2. Transistors Q1 and Q2 are controlled such that V1 and V2 are regulated to desired voltages.

It should be appreciated that voltage V1 should preferably be regulated to a value corresponding to approximately 2Vout*n1/n2 and voltage V2 should preferably be regulated to be a value corresponding approximately to 4Vout*n1/n2.

Transistors Q7-Q10 are controlled to operate as a synchronous rectifier and they can be phase shifted with transistors Q3-Q6 to provide voltage regulation and soft-switching.

Figure 22:
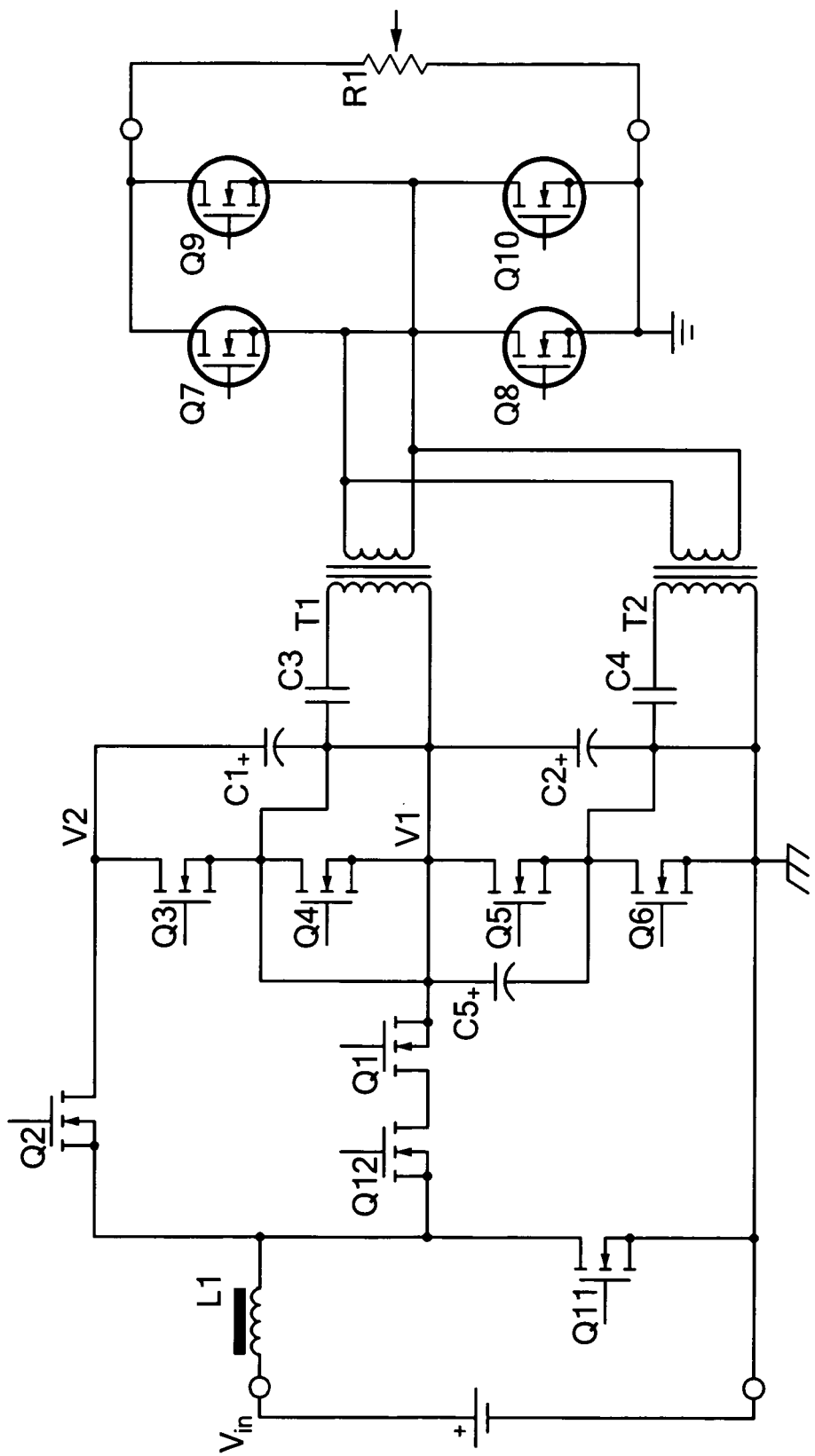
FIG. 22 is a schematic diagram of another embodiment of an example variable-input fixed-output two-voltage-domain switched-capacitor split-drive-transformer power converter.

Referring now to FIG. 22, in which like elements of FIG. 21 are provided having like reference designations, another embodiment of an illustrative variable-input fixed-output two-voltage-domain switched-capacitor split-drive-transformer power converter is shown. In this illustrative embodiment the variable-input fixed-output two-voltage-domain switched-capacitor split-drive-transformer power converter includes a boost-type level selection circuit which is different than the boost-type level selection circuit described above in conjunction with FIG. 21. The boost-type level selection circuit is able to further expand the input voltage range (i.e. expand the input voltage range beyond that which the selection circuit of FIG. 21 can provide). It should be appreciated that while the embodiment of FIG. 22 has higher component count than the embodiment of FIG. 21, the embodiment of FIG. 22 can handle wider range of input voltages than the embodiment of FIG. 21.

In this circuit, input voltage Vin can be any value between GND and voltage value V2. When the value of input voltage Vin is between a reference potential corresponding to ground (for example) and a voltage value V1 (i.e. GND<Vin<V1), transistor Q1 is kept on, transistor Q2 is kept off, and transistors Q11 and Q12 are controlled such that voltage V1 is regulated to desired values. When the value of input voltage Vin is between a reference potential corresponding to a voltage value V1 (for example) and a voltage value V2 (i.e. V1<Vin<V2), transistor Q11 is kept off, transistor Q12 is kept on, and transistors Q1 and Q2 are controlled such that voltage values V1 and V2 are regulated to desired values. Other components of the variable-input fixed-output two-voltage-domain switched-capacitor split-drive-transformer power converter of FIG. 22 are operated substantially in the same way as described above in connection with the variable-input fixed-output two-voltage-domain switched-capacitor split-drive-transformer power converter of FIG. 21.

Figure 23:
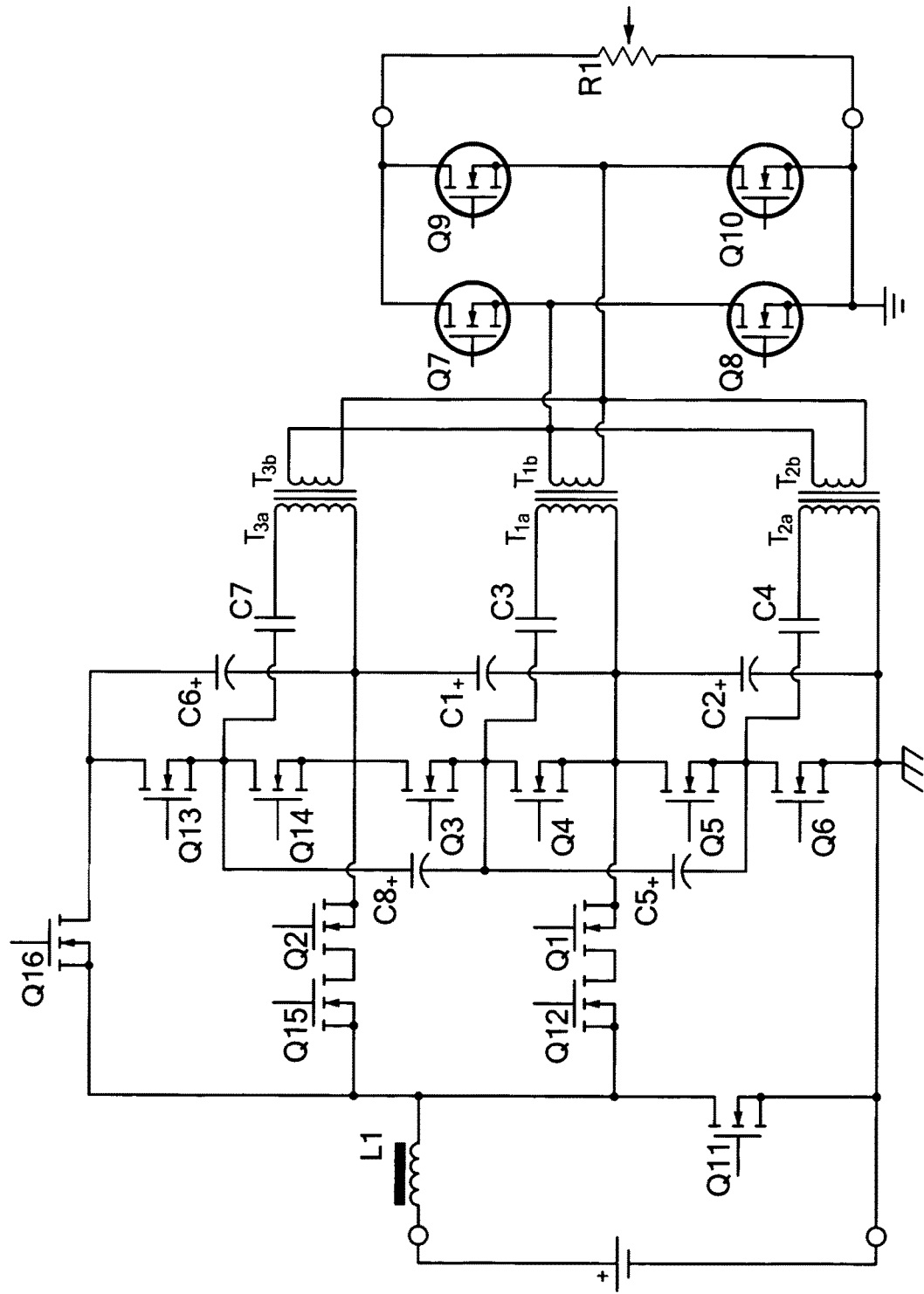
FIG. 23 is a schematic diagram of another embodiment of an example variable-input fixed-output two-voltage-domain switched-capacitor split-drive-transformer power converter.

Referring now to FIG. 23, an illustrative variable-input fixed-output three-voltage-domain switched-capacitor split-drive-transformer power converter comprises a split drive transformer having three primary windings T1a, T2a and T3a and three secondary windings T1b, T2b and T3b.

Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

The invention claimed is:

1. A power converter having an input and an output, the power converter comprising:

a power distribution and inverter stage having an input coupled to the input of the power converter and a plurality of outputs, wherein in response to a signal provided to the input of said power distribution and inverter stage, a set of voltage domains are formed at the plurality of outputs of the power distribution and inverter stage;

a split drive transformer stage having a plurality of windings coupled to corresponding ones of the plurality of outputs of said power distribution and inverter stage and having at least one output, said split drive transformer stage including a transformer structure having at least one magnetic flux linkage and said transformer structure configured to be driven by multiple ones of the set of voltage domains of said power distribution and inverter stage; and a power combiner and rectifier stage having at least input coupled to at least one output of said split drive transformer stage and having an output coupled to the output of the power converter said power distribution and inverter stage including a level selection circuit comprising at least one inductive element which serves as an energy storage device and a plurality of switching elements coupled to said at least one inductive element and wherein in response to one or more control signals provided thereto, the plurality of switching elements distribute current from said inductive element to at least two of the voltage domains of the power distribution and inverter stage such that at least one voltage of said set of voltage domains is regulated to a desired value.

2. The power converter of claim 1 wherein an output of each of the plurality of switches is coupled in parallel to a network of capacitors of said power distribution and inverter stage.

3. The power converter of claim 1 wherein said level selection circuit is a buck-type level selection circuit.

4. The power converter of claim 1 further comprising:
a first level selection circuit coupled between the input of the power converter and input of the power distribution and inverter stage; and
a second level selection circuit coupled between the output of the power combiner and rectifier stage and the output of the power converter, the second level selection circuit comprising at least one inductive element which serves as an energy storage device and a plurality of switching elements coupled to said at least one inductive element of the second level selection circuit and wherein in response to one or more control signals provided thereto, the plurality of switching elements of the second level selection circuit distribute current from said inductive element of the second level selection circuit to the output of the power converter.

5. The power converter of claim 1 wherein each of the plurality of switches of the level selection circuit is a bidirectional switch in which the switch state is dependent upon the output of the power combiner and rectifier stage.

6. The power converter of claim 5 wherein the level selection circuit is provided as a shift inductor level selection circuit (SILSC).

7. The power converter of claim 5 wherein said level selection circuit is provided as a boost-type level selection circuit.

8. The power converter of claim 7 wherein said power distribution and inverter stage comprises a two level power splitter and inverter.

9. The power converter of claim 7 further comprising one or more blocking capacitors coupled between said power distribution and inverter stage and said split drive transformer stage, said one or more blocking capacitors having a capacitance selected to prevent said split drive transformer stage transformer from saturation.

10. The power converter of claim 7 wherein said split drive transformer stage comprises a split drive transformer having a pair of primary windings and a pair of secondary windings and wherein the primary to secondary transformer turns ratio is n1:n2.

11. The power converter of claim 7 wherein said power combiner and rectifier stage are provided as a centralized full bridge rectifier.

12. The power converter of claim 11 wherein:
said power distribution and inverter stage comprises a first set of switching elements (Q3, Q4) which form a first half bridge circuit and a second set of switching elements (Q5, Q6) which form a second half bridge circuit wherein said first half bridge circuit is capable of operation with a 50% duty ratio and the second half bridge circuit is capable of operation with a 50% duty ratio; and
said level selection circuit comprises a first set of switching elements (Q1, Q2) coupled to the at least one inductive element and wherein the first set of switching elements of said level selection circuit are capable of being controlled so as to provide first and second regulated voltages (V1,V2) to inputs of said first and second half bridge circuits.

13. The power converter of claim 12 wherein:
an input voltage (Vin) is larger than the first regulated voltage (V1) and smaller than the second regulated voltage (V2) such that, V1<Vin<V2;
the first regulated voltage (V1) is regulated to be 2Vout*n1/n2 where n1 and n2 are the turns ratio of the split drive transformer and Vout is the voltage at the output of the power converter; and
the second regulated voltage (V2) is regulated to be 4Vout*n1/n2.

14. The power converter of claim 13 wherein said power combiner and rectifier stage comprises a plurality of switching elements configured such that said combiner and rectifier stage are capable of operating as a synchronous rectifier.

15. The power converter of claim 14 wherein:
said power distribution and inverter stage comprises switching elements; and
said switching elements of said combiner and rectifier stage can be phase shifted with said switching elements of said power distribution and inverter stage to provide voltage regulation and soft-switching.

16. The power converter of claim 1 wherein said power combiner and rectifier stage is provided having a parallel output.

17. The power converter of claim 1 wherein said power combiner and rectifier stage is provided having a series output.

18. The power converter of claim 1 wherein said split drive transformer stage is provided having an interleaved configuration.

19. The power converter of claim 1 wherein said power distribution and inverter stage comprises one or more half bridge switching cells.

20. The power converter of claim 1 wherein said power combiner and rectifier stage comprises one or more half bridge switching cells.

21. The power converter of claim 20 wherein said power combiner and rectifier stage comprises a plurality of switching elements configured such that said combiner and rectifier stage are capable of operating as a synchronous rectifier.

22. The power converter of claim 21 wherein:
said power distribution and inverter stage comprises switching elements; and
said plurality of switching elements of said combiner and rectifier stage can be phase shifted with said switching elements of said power distribution and inverter stage to provide voltage regulation and soft-switching.

23. The power converter of claim 1 wherein the duty ratio of the plurality of switching elements is controlled such that the voltage at the outputs of said power distribution and inverter stage are regulated to the desired voltage.

24. The power converter of claim 1 wherein the power distribution and inverter stage comprises a plurality of inverter circuits and at least one power balancer coupled between each of the plurality of inverter circuits.

* * * * *

UNITED STATES PATENT AND TRADEMARK OFFICE
CERTIFICATE OF CORRECTION

| | |
|---|---|
| PATENT NO. | : 9,825,545 B2 |
| APPLICATION NO. | : 14/911774 |
| DATED | : November 21, 2017 |
| INVENTOR(S) | : Minjie Chen et al. |

Page 1 of 1

It is certified that error appears in the above-identified patent and that said Letters Patent is hereby corrected as shown below:

Column 2, Line 54, delete "circuit" and replace with --circuits.--.

Column 3, Line 8, delete "cells" and replace with --cells.--.

Column 4, Line 5, delete "5A." and replace with --5A;--.

Column 4, Line 10, delete "6A." and replace with --6A;--.

Column 5, Line 27, delete "Is should" and replace with --It should--.

Column 5, Line 50, delete "combiner 14" and replace with --combiner 16--.

Column 10, Line 19, delete "Power converter 70" and replace with --Power converter 80--.

Column 10, Line 37, delete "9 and 9B," and replace with --9A and 9B,--.

Column 10, Line 47, delete "reduces the the" and replace with --reduces the--.

Column 12, Line 23, delete "output node" and replace with --output nodes--.

Column 12, Line 35, delete "$L_{in}$' and" and replace with --$L_{in}$') and--.

Signed and Sealed this
Eighth Day of January, 2019

Andrei Iancu
*Director of the United States Patent and Trademark Office*